(12) United States Patent
Byrne et al.

(10) Patent No.: US 11,256,240 B2
(45) Date of Patent: Feb. 22, 2022

(54) PLANNING AND ADAPTING PROJECTS BASED ON A BUILDABILITY ANALYSIS

(71) Applicant: Intrinsic Innovation LLC, Mountain View, CA (US)

(72) Inventors: Kendra Byrne, Mountain View, CA (US); Eli Reekmans, San Francisco, CA (US); Stoyan Gaydarov, Burlingame, CA (US); Marek Michalowski, San Francisco, CA (US); Michael Beardsworth, San Francisco, CA (US); Ryan Butterfoss, San Francisco, CA (US); Ytai Ben-Tsvi, Sunnyvale, CA (US)

(73) Assignee: Intrinsic Innovation LLC, Mountain View, CA (US)

( * ) Notice: Subject to any disclaimer, the term of this patent is extended or adjusted under 35 U.S.C. 154(b) by 42 days.

(21) Appl. No.: 16/705,445

(22) Filed: Dec. 6, 2019

(65) Prior Publication Data

US 2020/0174460 A1  Jun. 4, 2020

Related U.S. Application Data

(63) Continuation of application No. 15/611,777, filed on Jun. 1, 2017, now abandoned.

(51) Int. Cl.
*G05B 19/418* (2006.01)

(52) U.S. Cl.
CPC . *G05B 19/41865* (2013.01); *G05B 19/41885* (2013.01); *G05B 2219/35193* (2013.01); *G05B 2219/35499* (2013.01)

(58) Field of Classification Search
None
See application file for complete search history.

(56) References Cited

U.S. PATENT DOCUMENTS 5,889,926 A    3/1999  Bourne et al.
5,969,973 A *  10/1999 Bourne ............ G05B 19/41825
                                              700/165

(Continued)

FOREIGN PATENT DOCUMENTS

CN    102187047    9/2011
CN    103249368    8/2013
(Continued)

OTHER PUBLICATIONS

EP Extended Search Report in European Appln. No. 18809241.5, dated Dec. 17, 2020, 11 pages.

(Continued)

*Primary Examiner* — Mohammad Ali
*Assistant Examiner* — David Earl Ogg
(74) *Attorney, Agent, or Firm* — Fish & Richardson P.C.

(57) ABSTRACT

Disclosed herein is a worksite automation process that involves: generating a first sequence of tasks to build the product according to a model. The process further involves causing one or more robotic devices to build the product by beginning to execute the first sequence of tasks. Further, during the execution of the first sequence of tasks, performing a buildability analysis to determine a feasibility of completing the product by executing the first sequence of tasks. Based on the analysis, determining that it is not feasible to complete the product by executing the first sequence of tasks, and in response, generating a second sequence of tasks to complete the product according to the model. Then, causing the one or more robotic devices to continue building the product by beginning to execute the second sequence of tasks.

17 Claims, 15 Drawing Sheets

(56) References Cited

U.S. PATENT DOCUMENTS

| | | | |
|---|---|---|---|
| 8,355,818 | B2 | 1/2013 | Nielsen |
| 8,892,255 | B2 | 11/2014 | Eberst |
| 9,387,589 | B2 | 7/2016 | Barajas et al. |
| 9,630,316 | B2 | 4/2017 | Konolige et al. |
| 2010/0017009 | A1 | 1/2010 | Baseman et al. |
| 2010/0076797 | A1 | 3/2010 | Doerfler et al. |
| 2011/0054689 | A1 | 3/2011 | Nielsen et al. |
| 2011/0295424 | A1* | 12/2011 | Johnson ............... G05D 1/0274 700/248 |
| 2012/0215351 | A1* | 8/2012 | McGee .................. B25J 9/1666 700/248 |
| 2012/0215352 | A1* | 8/2012 | Eberst ................ G05B 19/4083 700/253 |
| 2012/0283863 | A1* | 11/2012 | Beum .............. G05B 19/41865 700/101 |
| 2013/0006409 | A1* | 1/2013 | Evans .................. G06Q 10/067 700/107 |
| 2013/0218528 | A1 | 8/2013 | Lind et al. |
| 2014/0022051 | A1 | 1/2014 | Levien et al. |
| 2014/0249882 | A1 | 9/2014 | Li |
| 2014/0343999 | A1 | 11/2014 | Kim et al. |
| 2015/0239127 | A1 | 8/2015 | Barajas et al. |
| 2015/0363513 | A1* | 12/2015 | Cassel ..................... G06F 30/00 703/1 |
| 2016/0136815 | A1 | 5/2016 | Linnell et al. |
| 2016/0346928 | A1 | 12/2016 | Zhang et al. |
| 2016/0357879 | A1* | 12/2016 | Beck ....................... G06F 30/00 |
| 2017/0024647 | A1 | 1/2017 | Cheong et al. |
| 2017/0351245 | A1 | 12/2017 | Zhang et al. |

FOREIGN PATENT DOCUMENTS

| | | |
|---|---|---|
| JP | H09509513 | 9/1997 |
| JP | 2004240659 | 8/2004 |
| JP | 2005190241 | 7/2005 |
| JP | 2012171091 | 9/2012 |
| JP | 2013084035 | 5/2013 |
| WO | WO 0116838 | 3/2001 |
| WO | WO 2015/113203 | 8/2015 |
| WO | WO 2016/138242 | 9/2016 |

OTHER PUBLICATIONS

"Minimum Efficient Scale", https://en.wikipedia.org/wiki/Mininnunn efficient scale, pp. 1 (Year: 2005).

Funes et al. "Computer Evolution of Buildable Objects," last accessed May 31, 2017, available at http://www.demo.cs.brandeis.edu/papers/ecal97.pdf 10 pages.

Ofori, "Building waste assessment score: design-based tool", Natl Univ of Singapore, Building and Environment 39, pp. 851, 855 Year: 2004.

PCT International Preliminary Report on Patentability in International Appln No. PCT/US2018/023775, dated Dec. 3, 2019, 7 pages.

PCT International Search Report and Written Opinion issued in International Application No. PCT/US2018023775, dated Jul. 16, 2018, 10 pages.

CA Office Action in Canadian Appln. No. 3,059,412, dated Dec. 8, 2020, 5 pages.

JP Office Action in Japanese Appln. No. 2019-554555, dated Nov. 24, 2020, 11 pages (with English translation).

JP Office Action in Japanese Appln. No. 2019-554555, dated Mar. 1, 2021, 14 pages (with English translation).

KR Office Action in Korean Appln. No. 10-2019-7029571, dated Feb. 26, 2021, 9 pages (with English translation).

JP Decision to Grant a Patent in Japanese Appln. No. 2019-554555, dated Jun. 2, 2021, 5 pages (with English translation).

Office Action in Chinese Appln. No. 201880024024.7, dated Dec. 23, 2021, 30 pages (with English translation).

* cited by examiner

PLANNING AND ADAPTING PROJECTS BASED ON A BUILDABILITY ANALYSIS

CROSS-REFERENCE TO RELATED APPLICATION

This application is a continuation of U.S. application Ser. No. 15/611,777, filed Jun. 1, 2017, the contents of which are incorporated by reference herein.

BACKGROUND

Unless otherwise indicated herein, the materials described in this section are not prior art to the claims in this application and are not admitted to be prior art by inclusion in this section.

Automated manufacturing processes may involve the use of one or more robotic devices that may be used to construct an output product, such as a car, a wall, a piece of furniture, or any number of other physical fabrications. The robotic devices may be equipped with end-effector-mounted tools, such as a gripper or a drill, which may be used during a construction process. The robotic devices may be programmed with sequences of specific motion commands and commands for other operations in order to cause the robotic devices to complete a process.

SUMMARY

The present disclosure provides systems and processes that relate to robotic automation of tasks in worksites in order to build or assemble products. As the automated tasks are being performed in the worksite, the systems and processes disclosed herein can adjust to deviations from a model of the product that is being built (e.g., a structure). For instance, a worksite automation system could coordinate a sequence of tasks in order to build an end product. As the system is building the product, the system could perform a buildability analysis to detect any issues that could prevent the system from building the product according to the model. If the buildability analysis indicates that the product is not buildable using the current sequence of tasks, the system could generate a new sequence of tasks that allows the system to continue building the product without necessarily changing the product's model. For example, if the system detects an issue while building the product, the system could generate a new sequence of tasks that allows the system to build off of the portion of the product that has been built thus far (i.e., "as-built") and to complete the product such that the product meets the requirements of the model. Thus, the system could preserve any work that has been accomplished before the issue was detected.

In one aspect, a computer-implemented method is provided. The method involves during a pre-build phase of building a product, generating a first sequence of tasks to build the product according to a model of the product. The method also involves during a build phase, causing one or more robotic devices to build the product by beginning to execute the first sequence of tasks. Further, the method involves, during the execution of the first sequence of tasks, performing a buildability analysis to determine a feasibility of completing the product by executing the first sequence of tasks. The method further involves determining, based on the analysis, that it is not feasible to complete the product by executing the first sequence of tasks. And in response to determining that it is not feasible to complete the product by performing the first sequence of tasks, the method involves generating a second sequence of tasks to complete the product according to the model, where the second sequence of tasks is different from the first sequence of tasks. Yet further the method involves causing the one or more robotic devices to continue building the product by beginning to execute the second sequence of tasks.

In another aspect, a worksite automation system is provided. The system includes one or more robotic devices, and a control system including one or more processors and one or more data storage devices. The control system is configured to: receive an instruction to build a product, where the instruction comprises one or more constraints on the product. The control system is also configured to during a pre-build phase: (i) determine a model for the product, and (ii) generate a first sequence of tasks to build the product according to the model. Further, the control system is configured to: during a build phase, cause the one or more robotic devices to build the product by beginning to execute the tasks of the first sequence of tasks, and execution of the first sequence of tasks, perform a buildability analysis of the first sequence of tasks to determine a feasibility of completing the product by executing the first sequence of tasks. Based on the analysis, if it is not feasible to complete the product, the control system is configured to generate a second sequence of tasks to complete the product according to the model, where the second sequence of tasks is different from the first sequence of tasks, and cause the one or more robotic devices to continue building the product by beginning to execute the second sequence of tasks.

In yet another aspect, a method is provided. The method involves during a design phase, generating a first sequence of tasks for a first model of a product. The method also involves during a build phase, causing one or more robotic devices to build the product by beginning to execute the first sequence of tasks. The method further involves during the performance of the first sequence of tasks, performing a first buildability analysis of the first model to determine a feasibility of building the product according to the first model, and based on the analysis, determining a second model. Yet further, the method involves causing the one or more robotic devices to continue building the product according to the second model.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
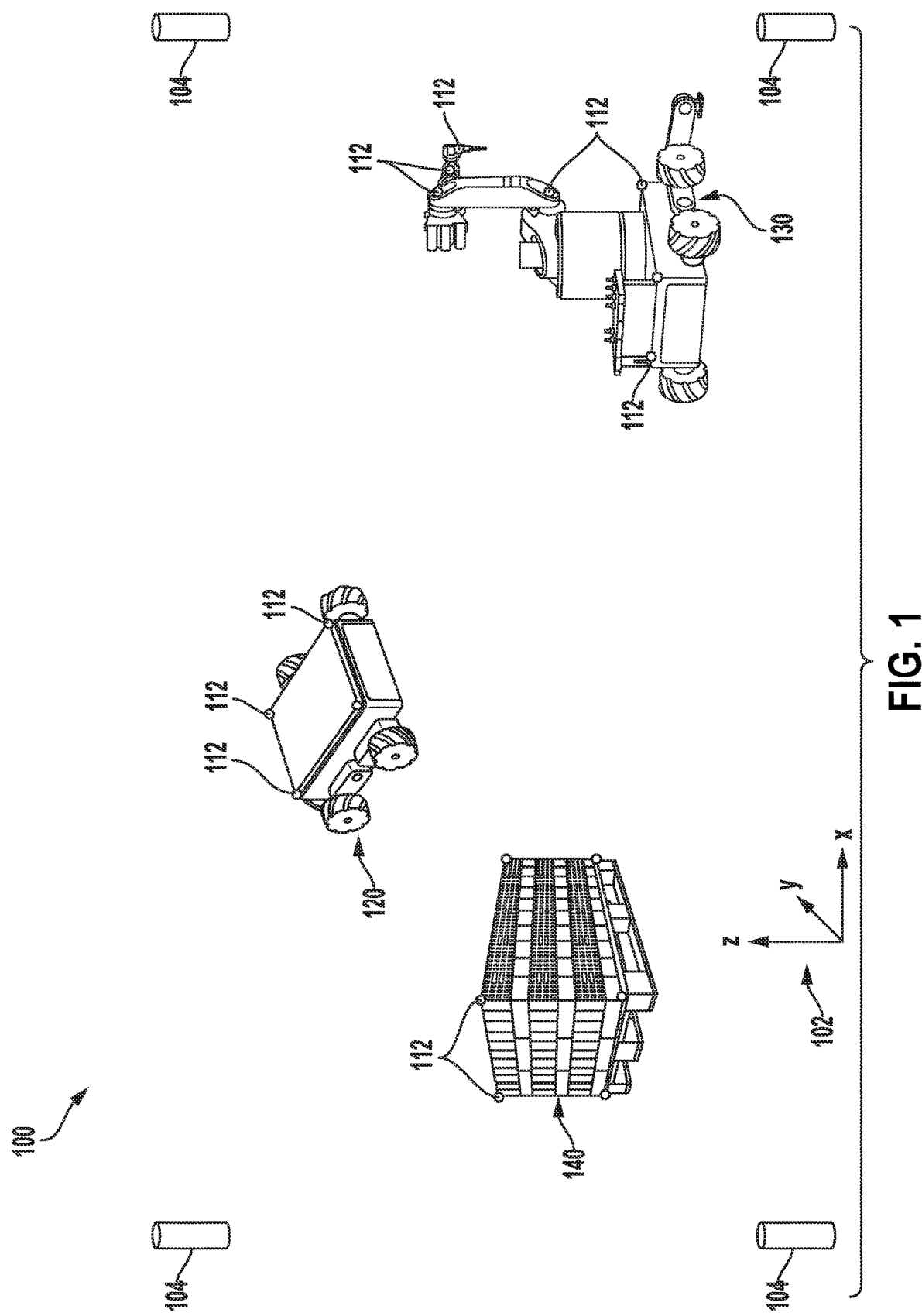
FIG. 1 depicts a worksite, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures should not be viewed as limiting. It should be understood that other embodiments might include more or less of each element shown in a given Figure. Further, some of the illustrated elements may be combined or omitted. Yet further, an example embodiment may include elements that are not illustrated in the Figures.

I. Overview

Disclosed herein is a system that could automate a sequence of tasks for building a product. The product that is being built by the system could be a discrete product or could be a product that is part of a larger product or structure. The product could be designed by a user, who could also specify constraints on the product. The specified constraints could be constraints on functional and/or non-functional features of the product. The constraints could also be performance constraints on a process of building the product. In particular, to build the product, the system could determine a model of the product that satisfies the constraints. Then, the system could determine a sequence of tasks that could be performed to build the product according to the model.

In particular, building a product could involve two phases. The first phase is a pre-build phase that involves two sub-phases: a design phase and a simulation phase. In the design phase, the system could determine a model for the product, and could also determine a sequence of tasks to build the product according to the model. And in the simulation phase, the system could simulate building the product, perhaps by simulating the performance of the sequence of tasks to build the product, the behavior of the product as the product is being built (e.g., stability of the product), and/or intermediate stages of the product. The second phase of building a product is a build phase. In the build phase, the system could perform the sequence of tasks in order to build the physical product.

However, in any of the phases, errors that could impede the system from building the product could occur. In particular, the errors could cause the system to build a product that deviates from the desired specifications. For example, during the build phase, deviations of the as-built product from the model could occur. Such deviations could accumulate to create an undesirable effect (e.g., a defect) in the final product. In general, the system could encounter issues in the pre-build phase and/or the build phase that could create undesirable effects in the final product.

Accordingly, to avoid errors that could impede the system from building the product or could cause the system to build a product that does not meet the desired specifications, the system could perform a buildability analysis that determines the feasibility of building a product, or a certain portion thereof. Generally, the system could perform pre-build buildability analyses during the pre-build phase, and then could perform build buildability analyses during the build phase (e.g., at the beginning of the build and/or in the midst of the build). Pre-build buildability analyses could allow the system to accurately and efficiently determine a model for the product. The pre-build buildability analyses could also allow the system to validate that a particular sequence of tasks could result in a successful completion of the product. And the build buildability analyses could allow the system to detect and efficiently adapt to any issues or changes that may occur while the system is building the product. By detecting and adapting to issues, the system could improve the probability that the product is built according to the desired specifications.

In an example, the system could perform a first buildability analysis as the system is determining a model of the product in the design phase. In particular, the first buildability analysis could determine whether the model satisfies any constraints on the product. As explained herein, product constraints define features of a class of products that encompasses the product that is being built. For example, a product constraint on a table could be that the table has one or more legs or supporting members that support a surface such that the surface will be level or horizontal when the legs are placed on a level floor. After determining the model, the first buildability analysis could determine whether the table's model describes a table that satisfies the constraints on the minimum number of legs and the orientation of the top surface, among other constraints. If the analysis determines that model does not satisfy the constraints, then the system could determine that the model is not buildable. But if the model satisfies the constraints, then the analysis could determine that the model is buildable.

The buildability analysis that is performed during the design phase could also determine whether the model satisfies other desired constraints on the table, which could be specified by a user, for example. For example, the constraints could define desired features or properties of the table such as the table's load limit, center of gravity, stability, stresses (e.g., bending stress), strengths (e.g., buckling strength), among other features or properties. The buildability analysis during the design phase could also determine whether the model satisfies non-functional features defined by the constraints. For example, the system could determine whether the model satisfies desired aesthetic features (e.g., engravings, fixtures, etc.) that are defined by the constraints.

If the buildability analysis determines that a model is not buildable, the system could then determine a new model, and could also perform a buildability analysis on the new model. This process is cyclical, and therefore, could be repeated until the buildability analysis determines a model that is buildable by the system. Once the system determines a buildable model, the system could generate a sequence of tasks that could be performed to build a product that satisfies the buildable model. In an embodiment, the system could use a tree structure to generate possible sequences of tasks to build the product. Then, the system could select a possible sequence of tasks to build the product.

Once the sequence of tasks is selected, the system could proceed to the simulation phase during which the system could simulate the performance of the sequence of tasks. Specifically, the system could simulate the performance of the tasks using resources available to the system. The resources could include available workers to perform the tasks, available tools that the workers can use to perform the tasks, and available materials to build the product. For example, the system could simulate robotic devices performing the sequence of tasks using resources (e.g., parts, materials, etc.) available to the system. By simulating the sequence of tasks using the resources available to the system, the system could perform a buildability analysis to determine whether it has the resources to build the product according to the determined model. For example, during the simulation, the analysis could determine whether the system has access to robotic devices that could be configured to perform each task of the sequence of tasks. By way of example, one of the tasks of building a table could be a sanding task, and the buildability analysis could determine whether the system includes a robotic device that could be configured to perform the sanding task.

During the simulation phase, the system could also determine an order in which the tasks of the sequence are to be performed (also referred to as an "order of operations"). In such a system, the buildability analysis (during the simulation phase) could also involve determining whether the tasks could be performed according to the determined order of operations. In an example, the analysis could determine whether a product is stable while being built if the tasks are performed in the determined order. In another example, the analysis could also determine whether any conflicts occur when building the product. For instance, the analysis could determine whether any timing or spatial conflicts occur between the robotic devices assigned to perform tasks. In yet another example, the analysis could determine whether the performance constraints are satisfied if the product is built using the determined sequence of tasks. For instance, based on the simulation, the analysis could determine the estimated time to build the product, and could then determine whether the performance time meets the performance constraints.

By performing the buildability analysis during the simulation phase, the system could determine whether the product is buildable using the resources available to the system. If the product is not buildable, the system could determine a new sequence of tasks to build the product according to the model. In some examples, the system could test a predetermined threshold number of sequences, each of which the analysis determines is not buildable. In these examples, the system could determine that the model is not buildable, and could return to the design phase to determine a new model for the product. Conversely, if the analysis determines that the product is buildable using the system's resources, the system could move to the build phase.

In the build phase, the system could build the product in the worksite by sending instructions to robotic devices located in the worksite. The instructions cause the robotic devices to perform the tasks according to the determined order of operations. In this phase, the system could perform a buildability analysis to determine whether any issues or changes have occurred that could require the system to adapt. Specifically, the system could receive data (e.g., from sensors and/or feedback from the robotic devices) indicative of the worksite, and the analysis could use the data to determine whether any deviations from the model have occurred. The analysis could also determine whether any deviations could occur in the future. The analysis could be based on conditions of the worksite (e.g., environmental conditions, obstacles), the current status of the product (e.g., status of completed structures and/or completed tasks), available resources, changes to the constraints (e.g., by a user), and deviations from the design (e.g., delay in time or deviations from structural design). If the analysis detects a deviation (either current or anticipated), the analysis could indicate the product is not buildable.

In an embodiment, in response to determining that the product is not buildable, the system could return to the design phase. In the design stage, the system could use the tree structure to generate a new sequence of tasks to build the product instead of the original sequence of tasks. In particular, the system could use the tree structure to generate a sequence of tasks that builds on the portion of the product that has been built thus far. As such, the new sequence of tasks preserves the work that has been performed. Preserving the work that has been performed could save time and costs. Further, generating a new sequence of tasks could be advantageous since generating a new model could require intensive computing power and a significant amount of time, which will incur high costs and cause delays in completing the product.

II. Example Systems and Methods

A. Example Worksite Coordinate Frame

FIG. 1 depicts a worksite coordinate frame 100, according to an example embodiment. The worksite coordinate frame 100 may define a portion of a physical environment in which objects, machines, and perhaps humans may be located. The worksite coordinate frame 100 may take on a three-dimensional form and may be used for various purposes. For instance, the worksite coordinate frame 100 may be defined for a construction site where the construction of a building or another project is being or is about to be carried out. As such, the worksite coordinate frame 100 may include a physical stage or stages on which a physical building process is planned or is occurring within the physical world.

However, while various aspects of the disclosure are discussed below in the context of a construction site, example implementations are not limited to construction sites and may extend to a variety of other worksite coordinate frames, such as retail spaces, manufacturing facilities, distribution facilities, office spaces, shopping centers, festival grounds, and/or airports, among other examples. Additionally, while one worksite coordinate frame 100 is shown in FIG. 1, example implementations may be carried out in the context of a plurality of worksite coordinate frames.

As depicted in FIG. 1, the worksite coordinate frame 100 includes a plurality of resources. The resources may include one or more actors, devices, hardware components, and/or physical materials. The physical materials may be construction materials 140, which may be any materials or tools located in a construction site. For example, in FIG. 1, the construction materials 140 are depicted as a palette of bricks. Within examples, the actors in the worksite coordinate frame 100 may include robotic actors and human actors. The human actors may have one or more skills. For example, a human actor may be a carpenter. Further, the human actors may interface with the robotic actors and devices using computing devices.

A worker robot 130 may be a robotic device configured to perform a task within the worksite coordinate frame 100. In the illustrated scenario, the worker robot 130 includes an end effector tool mounted to a robotic arm. The end effector tool may be configured to perform a task on a work surface, such as drilling, milling, cutting, welding, nailing, riveting, sanding, spraying, gripping, extruding, etching, carving, or any other task typically performed during construction of a building. Further, the robotic arm of the worker robot 130 may include a mount to which different types of end effectors can be attached. As such, different end effectors may be swapped out such that the worker robot 130 can perform different types of tasks. Further, the worker robot 130 may be capable of moving throughout the worksite. For example, as depicted in FIG. 1, the worker robot 130 may include wheels. However, other configurations for providing mobility are possible as well (e.g., biped devices, quadruped devices, treads, tracks, etc.).

As illustrated in FIG. 1, the worksite coordinate frame 100 includes a number of pylon markers 104. The pylon markers 104 may be located at the boundaries of the worksite coordinate frame 100 and/or throughout the worksite coordinate frame 100 and may be used to establish a three-dimensional coordinate system 102 within the worksite coordinate frame 100. For example, the three-dimensional coordinate system 102 may be a Cartesian coordinate system with an x-axis, a y-axis, and a z-axis. One of the pylon markers 104 may be designated as the origin of the coordinate system 102, and the remaining pylon markers 104 may be spaced a known distance from the origin. As a result, each of the pylon markers 104 may be associated with a known (x, y, z) coordinate within the coordinate system 102, where the x-, y-, and z-coordinates correspond to a distance from the origin pylon marker along the x-, y-, and z-axes respectively.

The pylon markers 104 do not necessarily need to be located at the boundaries of the worksite coordinate frame 100, but may alternatively or additionally be arranged at various known locations throughout the worksite coordinate frame 100. For example, in some embodiments, the pylon markers 104 may be arranged in a two-dimensional or three-dimensional grid throughout the worksite. However, other configurations are possible as well, and the pylon markers 104 may be arranged in any manner of known locations in the worksite coordinate frame 100.

The pylon markers 104 may be retroreflective such that the laser tracker of a robotic device 120 could measure the location of the pylon markers 104 with respect to the robotic device 120. By determining the location of a pylon marker with known coordinates from the robotic device 120, the coordinates of the robotic device 120 may be derived. As the robotic device 120 moves about the worksite coordinate frame 100, it may occasionally provide a line of sight between its laser tracker and a pylon marker 104. This provides updated coordinates for the location of the robotic device 120 as it moves about the worksite coordinate frame 100.

In addition to the pylon markers 104, the worksite coordinate frame 100 may include a number of additional markers 112. The markers 112 may be attached to various target objects throughout the worksite coordinate frame 100. For example, as depicted in FIG. 1, respective markers 112 may be attached to the robotic device 120, the worker robot 130, and/or the construction materials 140. The location of the markers 112 may be measured to provide coordinates within the coordinate system 102 associated with the robotic device 120, worker robot 130, and/or construction materials 140.

In some embodiments, determining the location of a target object in the worksite coordinate frame 100 may involve more than simply determining the location of a single point within a three-dimensional coordinate system. For instance, in some embodiments, the locations of a set of points may be determined to define a volume of the target object. For example, referring to FIG. 1, a three-dimensional space representing the volume of the construction materials 140 may be determined. A robotic device may determine the locations of a set of markers 112 attached to the construction materials 140. The markers 112 may be attached to the boundaries or edges of the construction materials 140, or in some embodiments, the markers 112 may be arranged on the construction materials 140 in any known manner. By determining the location of the set of markers 112 arranged on the construction materials 140, the location of a three-dimensional volume may be determined indicating a shape of the construction materials 140 within the worksite coordinate frame 100. Similarly, by determining the locations of sets of markers 112 arranged on various target objects, three-dimensional volumes and their positions within the worksite coordinate frame 100 may be determined for the mover robot 120, the worker robot 130, or any other object in the worksite coordinate frame 100.

In some embodiments, determining the location of a target object in the worksite coordinate frame 100 may include determining a pose of the target object relative to the worksite coordinate frame 100. The pose of the target object may include a combination of the position and orientation of the object. Various processes may be used to determine the pose of a target object, including analytic or geometric methods, genetic algorithm methods, and/or learning-based methods, among others.

In some embodiments, where the target object is a robotic device, the pose of the robot may be determined based on its operational state. The robotic device may have various operational states that result in different poses. A control system may determine the operational state of the robotic device. Given that the volume and/or shape of the robotic device is already known or has otherwise been determined, the control system may determine the pose of the robotic device based on the determined operational state.

For example, referring to FIG. 1, the worker robot 130 includes a robotic arm that may be positioned in any number of poses based on its operational state. One operational state may include configuring the robotic arm to perform a task on a work surface. However, an operational state may include any configuration of a robotic device in the worksite coordinate frame 100 that results in an associated pose. The volume and shape of the various components of the robotic arm are known or have otherwise been determined. Thus, by determining the pose (e.g., the position and orientation) of the robotic arm based on the operational state of the worker robot 130, a three-dimensional volume representing the space occupied by the robotic arm within the worksite coordinate frame 100 may be determined.

B. Example Robotic Control Systems

Figure 2:
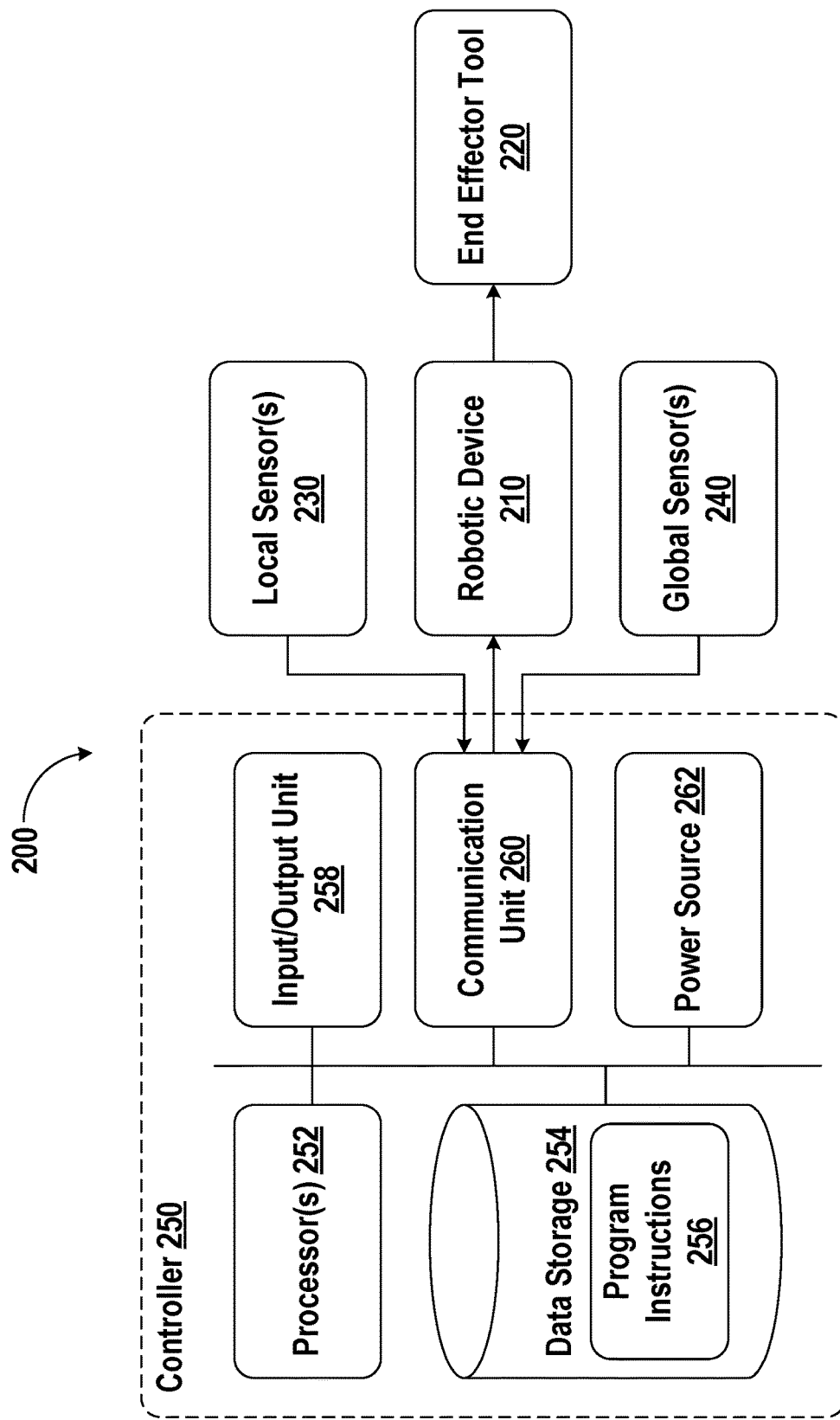
FIG. 2 is a simplified block diagram depicting components of a robotic device control system, according to an example embodiment.

FIG. 2 illustrates an example configuration of a robotic control system 200 that could be used in connection with the embodiments described herein. The robotic control system 200 may be configured to operate autonomously, semi-autonomously, and/or using directions provided by user(s). The robotic control system 200 could be responsible for managing a worksite, such as a construction site, a production site, a manufacturing site, an inspection or quality control site, etc. For example, in a construction or manufacturing worksite, the robotic control system 200 could be responsible for coordinating the construction or manufacturing of a product (also referred to interchangeably as "output product"). In particular, such a robotic control system could control one or more robotic devices to construct the product, and could also monitor the environment using one or more sensors.

As illustrated in FIG. 2, the robotic device control system 200 includes a robotic device 210 configured to control an end-effector 220. The end-effector 220 could be a tool end-effector that is configured to perform a task on a work surface (e.g., a surface of the output product) and could be mounted to a moveable component, such as a robotic arm, of the robotic device 210. The robotic device 210 could be located within a worksite (e.g., site 100 depicted in FIG. 1).

According to one example, the worksite could be a factory floor where robotic devices install parts in an assembly line to assemble a product (e.g., a table, airplane wing, etc.). According to an additional example, rather than an assembly line, the worksite could be a worksite where robotic devices combine a variety of parts to construct a physical structure. In these examples, the worksite could be a temporary location from which the final physical structure may be delivered (e.g., as a product) to another location (e.g., a distributor or customer location) when completely built.

According to yet another example, the worksite could be a municipal site where robotic devices work with heavy construction materials to construct a bridge or a road. According to a further example, the worksite could be a construction site where robotic devices work with construction materials to construct a house or a building. The worksite could also be the interior of a house where robotic devices install housing materials to construct a section of the house. In these examples, the final physical structure is installed in the worksite.

The robotic control system 200 could further include local sensor(s) 230 and global sensor(s) 240 configured to provide environment data representative of the worksite. For example, the local sensor(s) 230 and global sensor(s) 240 could determine the location of various objects in the worksite, such as a product that is being built by the system, for example. As another example, the local sensor(s) 230 and the global sensor(s) 240 could provide the robotic control system 200 with data that the robotic control system 200 can use to generate a "world map" of the worksite. The world map could be indicative of a real-time or near real-time representation of the worksite. Thus, the local sensor(s) 230 and global sensor(s) 240 could provide the robotic control system 200 with data such that the robotic control system 200 could update the world map continuously or periodically. The robotic control system 200 could also use the sensor data and/or the world map to track the performance of a task in the worksite. In particular, the robotic control system 200 could track any robotic devices participating in the task, any materials used in performing the task, and any changes to the as-built product as a result of performing the task.

Additionally, the local sensor(s) 230 could be arranged on or within the robotic device 210 and could be configured to measure the location of the end-effector 220 with respect to a work surface (e.g., a surface of the product being built). The local sensor(s) 230 could also be configured to scan or capture features of the work surface. The global sensor(s) 240, on the other hand, could be arranged within the worksite and could be configured to measure the location of the output product with respect to a coordinate system in the worksite. The global sensor(s) 240 could also be configured to measure the location of the end-effector 220 with respect to the coordinate system or with respect to another object (e.g., location of the base of the robotic device). Further, the global sensor(s) could also be configured to measure the location of the robotic device 210.

In an embodiment, the global sensor(s) 240 could include a laser tracker system with very high resolution (e.g., hundredths of a millimeter). The laser tracker system could be used to determine locations of objects in the worksite. However, the global sensor(s) 240 are not limited to laser tracker systems, but could include any sensor capable of capturing features of objects located in the worksite, such as motion capture sensors, scanners, light detection and ranging (LIDAR) sensors, point cloud sensors, ultrasonic range sensors, Global Positioning System (GPS) receivers, sonar, optical sensors, Radio Frequency identification (RFID) systems, Near Field Communication (NFC) chips, wireless sensors, radio sensors, radars, cameras (e.g., color cameras, grayscale cameras, and/or infrared cameras), and/or range sensors (e.g., ultrasonic and/or infrared), among others.

And the local sensor(s) 230 could include a high speed camera for providing optical flow data or an inertial measurement unit (IMU). However, the local sensor(s) 230 are not limited to high speed cameras or IMUs, but could include any sensor capable of measuring the location of the end-effector 220 with respect to a work surface or capable of capturing features of the work surface. Such sensors include force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chips, wireless sensors, light sensors, touch sensors (e.g., capacitive sensors), scanners, cameras (e.g., color cameras, grayscale cameras, and/or infrared cameras), and/or range sensors (e.g., ultrasonic and/or infrared), among others. In some embodiments, the location of the end-effector 220 with respect to a work surface could be determined using wheel odometry and/or robot forward kinematics.

Additionally, the local sensor(s) 230 and global sensor(s) 240 could be positioned within or in the vicinity of the worksite, among other possible locations. For example, the local sensor(s) 230 could be attached to the robotic device 210. In some embodiments, the global sensor(s) 240 could be arranged in fixed locations throughout the worksite, for example, as a dedicated sensing installation. Further, an example implementation may also use sensors incorporated within existing devices, such as mobile phones, laptops, and/or tablets. These devices may be in possession of workers located in the production site, such as construction workers in a construction site.

FIG. 2 also depicts a controller 250 that could receive data from the local sensor(s) 230 and global sensor(s) 240. In particular, the local sensor(s) 230 and global sensor(s) 240 could provide sensor data to the controller 250 through a communication unit 260. The communication unit 260 could include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

In other examples, the robotic control system 200 could include access points through which the local sensor(s) 230 and global sensor(s) 240 and/or controller 250 could communicate with a cloud server. Access points may take various forms such as the form of a wireless access point (WAP) or wireless router. Further, if a connection is made using a cellular air-interface protocol, such as a CDMA or GSM protocol, an access point may be a base station in a cellular network that provides Internet connectivity via the cellular network. Other examples are also possible.

The controller 250 is shown to include one or more processor(s) 252, data storage 254, program instructions 256, an input/output unit 258, and a power source 262. Note that the controller 250 is shown for illustration purposes only, as the controller 250 could include additional components and/or have one or more components removed without departing from the scope of the disclosure. Further, note that the various components of the controller 250 could be arranged and connected in any manner. The controller 250 could be incorporated in whole or in part into the robotic device 210 or could take the form of a desktop computer, a laptop, a tablet, a wearable computing device, and/or a mobile phone, among other possibilities.

Each processor, from the one or more processor(s) 252, could be a general-purpose processor or a special purpose processor (e.g., digital signal processors, application specific integrated circuits, etc.). The processor(s) 252 could be configured to execute computer-readable program instructions 256 that are stored in the data storage 254 and are executable to provide the functionality of the controller 250 described herein. For instance, the program instructions 256 could be executable to provide for processing of sensor data received from the local sensor(s) 230 and global sensor(s) 240.

The data storage 254 could include or take the form of one or more computer-readable storage media that can be read or accessed by the processor(s) 252. The one or more computer-readable storage media could include volatile and/or non-volatile storage components, such as optical, magnetic, organic or other memory or disc storage, which could be integrated in whole or in part with the processor(s) 252. In some embodiments, the data storage 254 could be implemented using a single physical device (e.g., one optical, magnetic, organic or other memory or disc storage unit), while in other embodiments, the data storage 254 could be implemented using two or more physical devices. Further, in addition to the computer-readable program instructions 256, the data storage 254 could include additional data such as diagnostic data, among other possibilities. Further, the controller 250 could also include a power source 262 configured to supply power to various components of the controller 250.

Any type of power source could be used, such as direct current from a battery or alternating current from mains electricity.

FIG. 1 further depicts the controller 250 including an input/output unit 258. The input/output unit 258 could output information to a user through a display. The display could take on any form and may be arranged to project images and/or graphics to a user of the controller 250. In an example arrangement, a projector within the input/output unit 258 could be configured to project various projections of images and/or graphics onto a surface of the display. The display could include: an opaque or a transparent (or semi-transparent) matrix display, such as an electroluminescent display or a liquid crystal display, one or more waveguides for delivering an image to the user's eyes, or other optical elements capable of delivering an image to the user. A corresponding display driver could be disposed within the controller 250 for driving such a matrix display. Other arrangements could also be possible for the display. As such, the display could show a graphical interface that could provide an application through which the user could interact with the systems disclosed herein.

Further, the robotic control system 200 could display the world map on the display of the input/output unit 258. Therefore, the input/output unit 258 could display a real-time or near real-time representation of the worksite, including the as-built product. Accordingly, a user could monitor the progress of building or assembling the output product. Based on the real-time feedback data (e.g., data from local sensor(s) 230 and global sensor(s) 240) indicative of the worksite, the displayed world map could be updated to reflect the real-time changes in the worksite.

The input/output unit 258 could also include task controls. The task controls could provide a user with real-time control of task execution. For instance, the user could be able to provide an input that could start, stop, skip, or modify a task. For instance, a graphical interface displayed on display could include a task queue of the tasks that the robotic control system 200 will perform. The graphical interface could allow the user to start, stop, skip, or modify a task. In some implementations, the graphical interface could allow the user to enter parameters relating to the output product. The graphical interface could allow the user to enter parameters that could relate to aspects of the output product, including dimensions, density, curvature properties, other geometric properties, materials to be used, and/or other numeric inputs.

In further examples, the graphical interface could contain a timeline of the building the output product. The timeline could have a cursor representing a current timestamp, which could represent a particular point in time of the process of building the output product. In addition, the timeline could contain buttons to play through the process at a particular speed, or fast-forward or rewind through the process. The timeline could be used to control the point in time at which the geometry and/or other aspects of the worksite are displayed within the display. Further, the timeline could be used to indicate a particular point in time either for purposes of simulating the output product or for visualizing within software an actual physical building process taking place within the worksite. Further, a user could modify the design of the output product via the graphical interface.

In some examples, the display could provide users with multiple 3D views of the worksite, and could allow a user to change the orientation and/or zoom of a particular view. In other examples, the display could present other types of representations of the worksite, such as numerical representations, as well or instead. In further examples, users could be provided with a three-dimensional (3D) modeling graphical interface that allows the user to alter one or more variables describing a worksite and/or the desired output product that affect a building process in the worksite.

In further examples, the graphical interface could include parameters describing aspects of the process during runtime. In particular, robot parameters could be displayed that describe characteristics of the robotic device 210, such as the position of the robotic device 210, physical tools currently being used by the robotic device 210, and/or axes along which the robotic device 210 is currently operating within the worksite. Additionally, tool parameters could be displayed describing operating characteristics of the end-effector 220. For instance, an amount of power being supplied to a spindle or an amount of force being used with a gripper could be displayed within an example graphical interface. Additionally, the graphical interface could display sensor data. The graphical interface could also contain controls related to ordering and/or speed of execution of tasks. Further, the graphical interface could contain controls relating to the robot actors, such as robot positions and diagnostics. Additionally, the graphical interface could allow for control of different attributes of the output product. Within the graphical interface, controls could be provided for manipulating one or more tasks being executed during runtime. For example, a user could be able to interact with graphical using touch input in order to modify a building process by altering planned tasks in real time or almost real time.

In some examples, a graphical interface could include a device control in order to select a particular device within a worksite. For example, the graphical interface could display the robot actors within worksite and could allow for a selection of a particular robotic device. Additionally, the graphical interface could include robot parameters, such as position information describing the current position of robotic devices. In some examples, the position could be displayed as Cartesian coordinates, as robot axes values, or both. In further examples, the position information could reflect the position of an end-effector of a robot actor or of a physical tool mounted on the robot's end-effector.

Additionally, the input/output unit 258 could receive user-input (e.g., from the user of the controller 250). In particular, the input/output unit 258 could allow for interaction with the graphical interface such as for scrolling, providing text, and/or selecting various features of the application, among other possible interactions. The input/output unit 258 could take on various forms. In one example, the input/output unit 258 could include a pointing device such as a computing mouse used for control of the graphical interface. However, if the input/output unit 258 includes a touch screen display, touch-input could be received (e.g., such as using a finger or a stylus) that allows for control of the graphical interface. In another example, the input/output unit 258 could include a keyboard that provides for selection of numbers, characters and/or symbols to be displayed via the graphical interface. For instance, in the arrangement where the input/output unit 258 includes a touch screen display, portions the display could show the keyboard. Thus, touch-input on the portion of the display including the keyboard could result in user-input such as selection of specific numbers, characters, and/or symbols to be shown on the graphical interface through the display. In yet another example, the input/output unit 258 could include a voice input device that receives audio input, such as from a user through a microphone, that is then interpretable using one of various speech recognition techniques into one or more characters that may be shown through the display. Other examples may also be possible.

C. Worksite Automation System

Example embodiments may provide for a system and processes for worksite automation in manufacturing, fabrication, and construction worksites, among other types of worksites. Worksite automation could involve automating the process of designing and/or building a product in a worksite. In particular, the worksite automation system could determine a model for a product, and could then generate a sequence of tasks that could be performed to build the product according to the model. And the sequence of tasks could be executed by available actors that are located in the worksite. When executing the tasks, the actors could utilize available resources disposed in or near the worksite. In an example, the tasks could be executed by robotic devices, and therefore, the product could be built, partially or entirely, by robotic devices.

Figure 3:
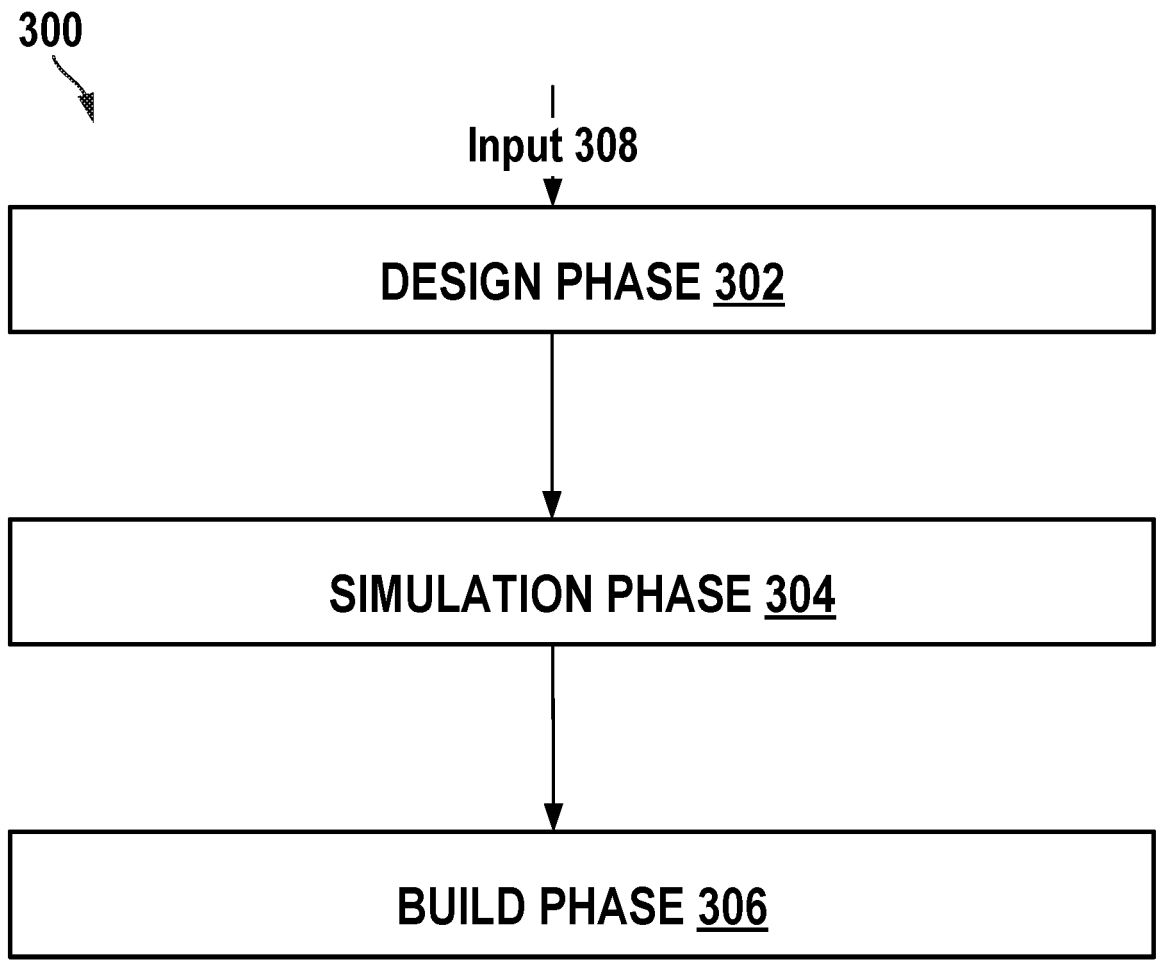
FIG. 3 is a flowchart depicting phases of building a product, according to an example embodiment.

FIG. 3 illustrates phases 300 of building a product, according to an exemplary embodiment. As illustrated in FIG. 3, building a product could involve three phases: a design phase 302, a simulation phase 304, and a build phase 306. In particular, the design phase 302 and the simulation phase 304 could involve processes that are performed prior to building the product, and therefore, the design phase 302 and the simulation phase 304 could collectively be referred to as a pre-build phase. However, as explained below, the system could return to the pre-build phase after the build phase 306 has commenced.

Furthermore, each of the phases 300 could be performed with little to no input from a user. As such, the system could semi-autonomously or autonomously build the product. Further, the design phase 302 and the simulation phase 304 could be performed using a computing device. In some examples, the design phase 302 and the simulation phase 304 could be performed using the same computing device that provides instructions to actors during the build phase 306.

In an embodiment, and as illustrated in FIG. 3, the worksite automation system could receive an input 308. The input 308 could be received from a user (e.g., via an input to a computing device) or could be received from another computing device. Within examples, the input 308 could be indicative of an instruction to build or assemble a product in the worksite. As such, responsive to receiving the input 308, the system could build or assemble the product. In particular, the system could build the product by performing processes associated with each of the phases 300. As illustrated in FIG. 3, responsive to receiving the input 308, the system could determine a design of the product by performing processes associated with the design phase 302.

a. Design Phase

Figure 4:
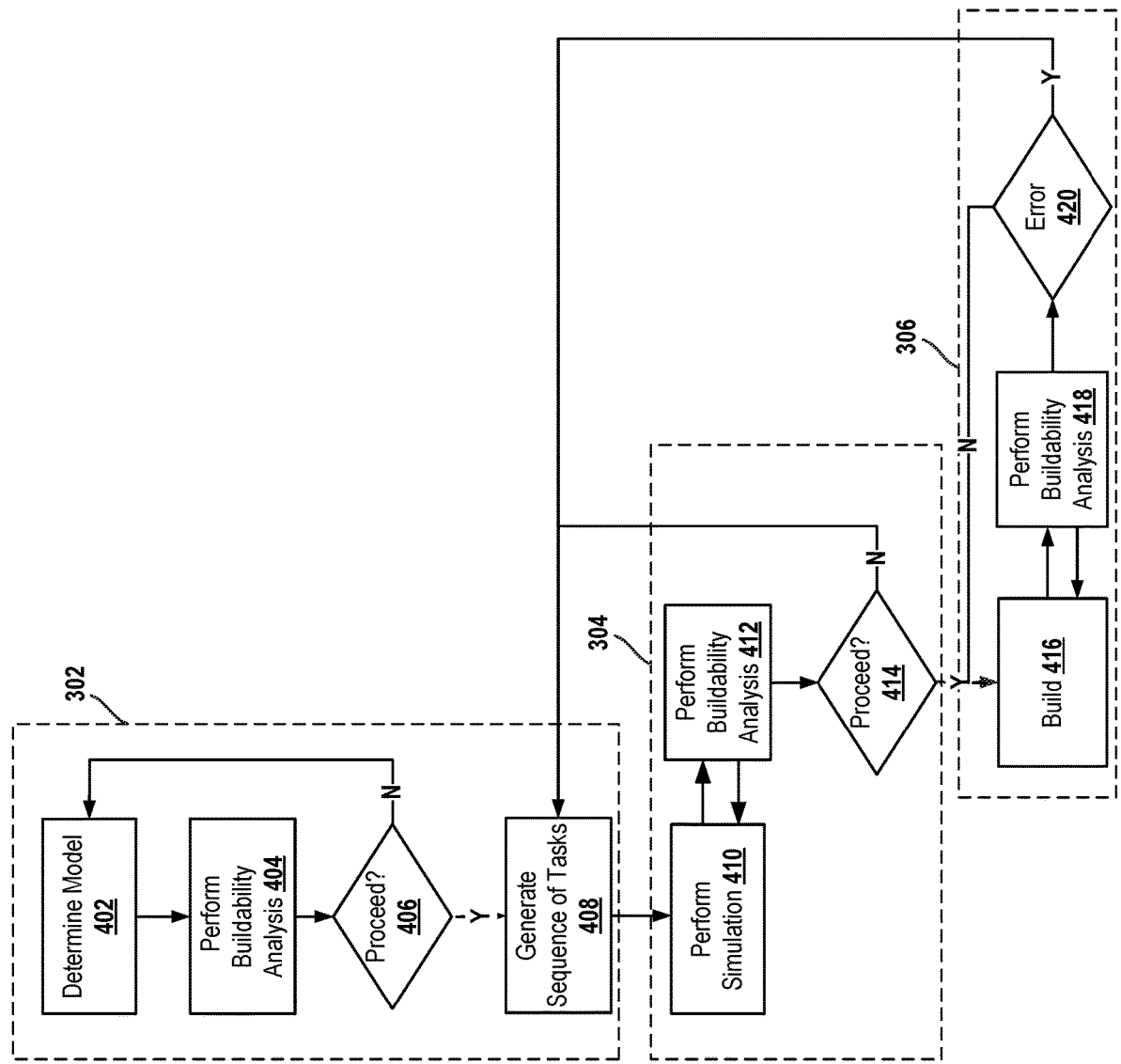
FIG. 4 is a flowchart depicting processes of the phases of building a product, according to an example embodiment.

FIG. 4 illustrates processes that are associated with each of the phases 300 of building a product, according to an exemplary embodiment. As illustrated in FIG. 4, in a first process 402 of the design phase 302, the system could be configured to determine a model for the product. The model of the output product could be a two-dimensional (2D) or three-dimensional (3D) representation of the product. Generally, a model could indicate how the physical structure of the product will be configured and how the product will function once built by the system. The model could also be indicative of other features of the product, such as characteristics of the materials and parts that are used to build the product.

In one implementation, the system could determine the model for the product by receiving the model from a user of the system. For instance, the user could design the model, and could then include the model as part of the input 308. Typically, the user could use design software to develop the model. In particular, the designed model could be a 2D or 3D computer-aided design (CAD), among other types of models. For instance, in a construction worksite, building information modeling (BIM) could be used to design and model a construction project. The type of model could depend on factors such as the conventions of the product type and/or the user's preferences.

In another implementation, the system could determine the model for the product by receiving the model from another system or device. For instance, responsive to receiving the input 308, the system could retrieve the model from a database. The database could include models of a variety of products, such as products that are commonly constructed or assembled. Additionally and/or alternatively, the database could be a commercial database that stores models that could be purchased by the system.

In yet another implementation, the system could determine the model for the product by generating the model for the product. In this implementation, the input 308 could be indicative of a type of the product and one or more constraints on the product. The product type and the one or more constraints could be defined by the user, for instance. Once the system receives the input 308, the system could then generate based on the product type and the constraints the model for the product. More specifically, the system, based on the product type, could determine characteristics that define the product type. The system could then use the determined characteristics and the one or more constraints to generate the model such that the model satisfies the product characteristics and the desired constraints.

In an embodiment, the constraints that are included in the input 308 could define desired high-level specifications of the product, such as the genus or species of the product. The high-level specifications could also include materials to be used in the product, functional features of the product, aesthetic features of the product, etc. For instance, the constraints could define maximum and/or minimum values for parameters (e.g., dimensions) of the product. Additionally and/or alternatively, the constraints could be indicative of spatial considerations in the worksite (e.g., where to build the product, location of obstacles, etc.). Additionally and/or alternatively, the constraints could define low-level specifications, which could be indicative of constraints on relationships (e.g., relative positioning) between components of the product. Additionally and/or alternatively, the constraints could be indicative of performance constraints on a building process of the product. Examples of performance constraints include, but are not limited to, building time, speed, manufacturing methods, efficiency, cost, material waste, resources used, etc.

Consider, for example, that the input 308 indicates that the product type is a chair. The input 308 could include high-level constraints that indicate a type of chair (e.g., armchair), desired materials to be used in the armchair, load support constraints (e.g., minimum/maximum weight support, load bearing surface locations, etc.), where to install the armchair in the worksite, etc. Then, based on the input 308, the system could generate a model for the armchair.

Figure 5:
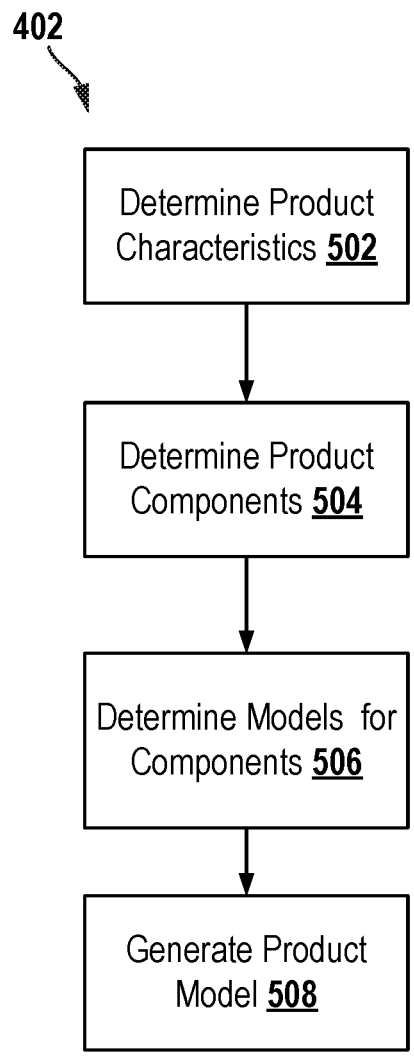
FIG. 5 is a flowchart depicting processes that are performed during a design phase, according to an example embodiment.

FIG. 5 illustrates steps of the process 402 of determining a model, according to an exemplary embodiment. As illustrated in FIG. 5, the first step 502 could be for the system to determine characteristics that define the type (e.g., class) of product. The characteristics could be functional characteristics that define what constitutes a structurally sound structure of the product type. The characteristics could also be non-functional characteristics that define aesthetic features of the product type. The characteristics could be shared amongst all or a portion of products that fall with the product type. Within examples, the characteristics could be stored in a database that could be accessed by the system.

As illustrated in FIG. 5, the next step 504 could be for the system to determine components of the product. In particular, the system could use the product type to determine the possible components of the product. The system could, for example, determine from a database the components that are used in the product type. For instance, the database could include templates of various product types. A template is indicative of components that could be included in the product type, such as components that are common amongst products of the product type. In some examples, a template could also be indicative of a sample arrangement of components in a product of the product type.

Figure 6:
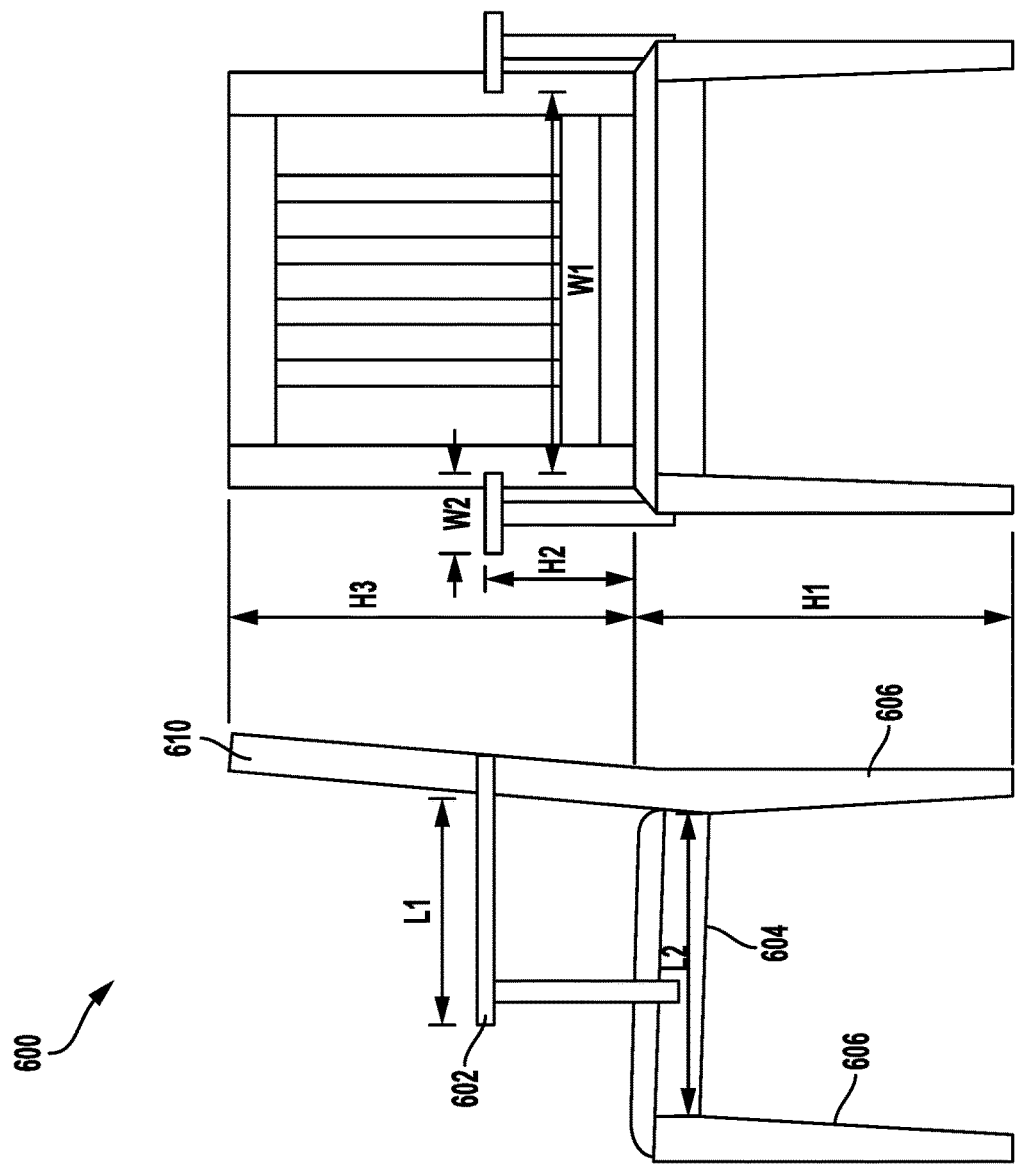
FIG. 6 illustrates a template of a chair, according to an example embodiment.

FIG. 6 illustrates an example template of an armchair 600, according to an exemplary embodiment. As illustrated in FIG. 6, the template could include components of the armchair 600, such as an acceptable number of legs and arms. For instance, the armchair 600 includes four legs 606. The template could also specify that the armchair 600 could include a back-support 610, a seat 604, and two arms 602. The template could also specify a sample arrangement of the components of the armchair. For example, as illustrated in FIG. 6, the template could indicate each of the legs 606 is coupled one end to the seat 604. Further, the template could be indicative of possible relationships between components of the product (e.g., relative positioning of the components).

Additionally, the template could indicate possible characteristics of the armchair 600. As illustrated in FIG. 6, the template could indicate a range of acceptable values of dimensions of the various components of the armchair 600. In this example, the template of the armchair 600 illustrates a height H1 indicative of a height of the seat 604, an armrest height H2, an arrest width W2, a seat width W1, a backrest height H3, a seat length L2, an armrest length L1, among other dimensions. Each value could be indicative of a range of acceptable values for the respective feature. The template could also be indicative of non-functional characteristics, such as acceptable materials from which the components of the armchair 600 could be manufactured. Examples of acceptable materials that could be used in the armchair 600 include solid wood, wood slats, padded leather, stuffed fabric, metal, molded plastic, among other materials.

Returning to FIG. 5, after the system performs the process 504 of determining the product's components, the system could then perform the process 506 of determining a model for each of the components. In one implementation, the template of the product type could specify sample models of each component, and therefore, the system could determine from the template the model for each component. If the system uses the sample component models, the system could, if necessary, adjust the model of each component such that each model satisfies any constraints on the product.

In another implementation, the system could generate a model for each component. In this implementation, the system could use characteristics of a component and the constraints to iteratively generate a geometry for the component. Iteratively generating a component's geometry could involve the system generating based on the component's characteristics a model for the component, and then iteratively adjusting the model until the model satisfies the constraints on the component. Alternatively, the system could generate based on a component's characteristics a plurality of models for the component, and then could select a model that satisfies the constraints.

As illustrated in FIG. 5, after performing process 506, the system could then perform process 508 of generating a model for the product. In an example, the system could iteratively generate one or more models by incorporating the one or more models of each component of the product (that were determined during process 506). Iteratively generating one or more models could involve generating one or more models for the product such that each model includes a different permutation of the various models of the components. Further, in some examples, the models of the components could be discrete such that the model may not include a design of a connector that connects one component to another component. In such examples, generating a product model may include generating designs of connectors between the different components. Additionally and/or alternatively, generating a product model could include designing aesthetic features of the product.

In one example, the system could generate a model in a bottom up process. The system could first determine how to incorporate two components together. This step could include determining functional features of the components, the designs of connectors between the two components, aesthetic features, etc. The system could then connect the two components, and could iteratively adjust the model of the two components until the model satisfies any constraints on the two components. Next, the system could determine how to incorporate another component with the two components. This process could be repeated until all of the components are incorporated into the model.

Once the system has generated a model of the product, the system could then iteratively adjust the model until the model satisfies the constraints. In an embodiment, iteratively adjusting a model so that the model satisfies the constraints may include adjusting one or more parameters of the model. The parameters that could be adjusted include the geometry of the components, dimensions of the components, materials of the components, etc. The system could adjust these parameters as long as the values of the parameters fall within the range of values defined by the product's characteristics. In addition the system could adjust the parameters such that the model satisfies any performance constraints. If the system cannot adjust a model to satisfy the constraints, the system could determine that the model is not buildable, and may therefore discard the model. Other methods of generating a model for a product are also possible. For instance, the system could generate a model by randomly and iteratively adjusting parameters of the different components of the product until the model satisfies the constraints on the model.

Once the system has generated one or more models of the product, the system could then select a model from the one or more models. In an example, the system could select a model that best satisfies a performance constraint. For example, the performance constraint could indicate that the system should optimize the model for cost. Accordingly, the system could select the model that has the least estimated cost. In some examples, a user of the system may define a default performance constraint for which to optimize. Alternatively, if there isn't a performance constraint on the project, the system may select any of the models that satisfy the constraints. Examples of performance constraints include optimizing for an aesthetic or functional property, optimizing for time, optimizing for accuracy, among other examples.

FIGS. 7A-7F illustrate an example of the system performing the process 402 of determining a model of a product. In this example, the input 308 into the system could indicate that the product is a table. And the input 308 could also indicate desired constraints on the table. In an embodiment, responsive to receiving the input 308, the system could commence the design phase 302 by performing the process 402 of determining a model of the table. In particular, the first step of the process 402 is determining the product characteristics of the table (step 502 in FIG. 5). Within examples, the system could use a template of a table to determine the characteristics of the table.

Figure 7A:
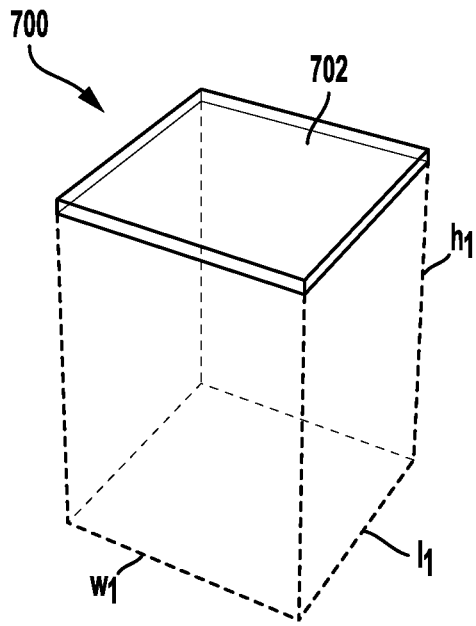
FIG. 7A depicts constraints on a table, according to an example embodiment.
Figure 7B:
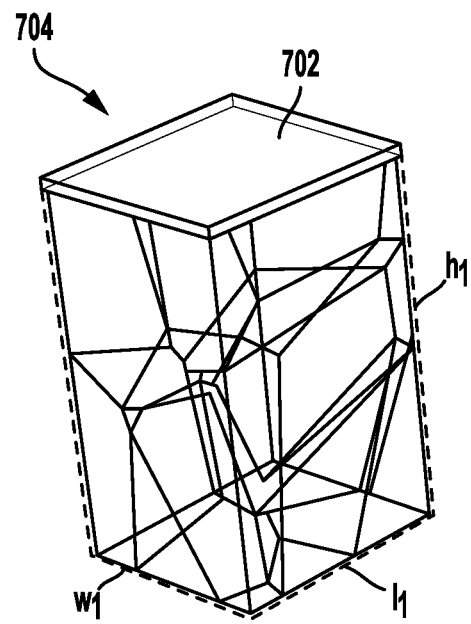
FIGS. 7B, 7C, 7D, 7E, and 7F each depict a design of a table, according to an example embodiment.
Figure 7C:
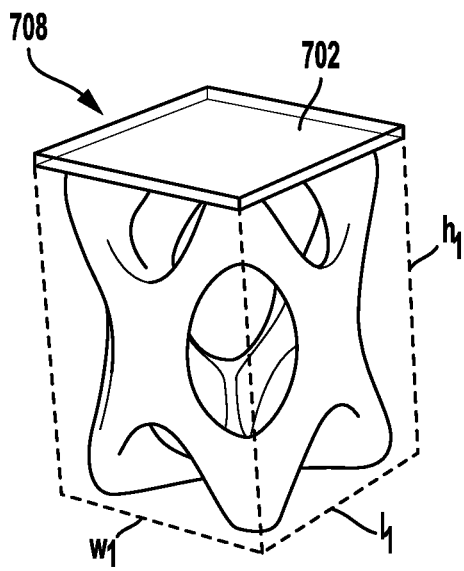
Figure 7D:
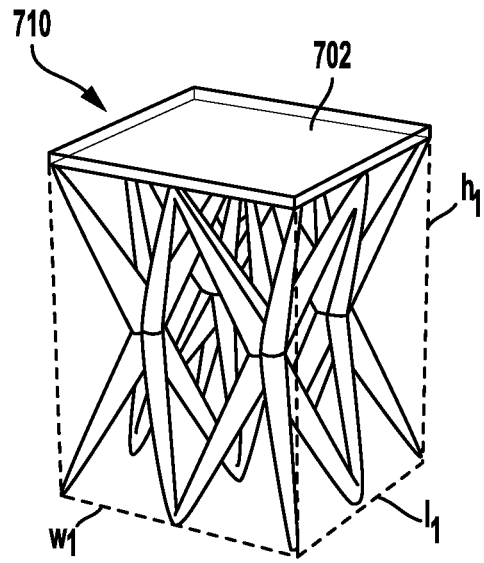
Figure 7E:
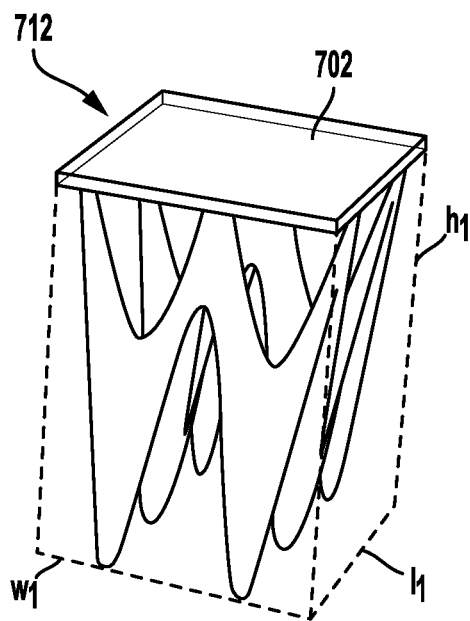
Figure 7F:
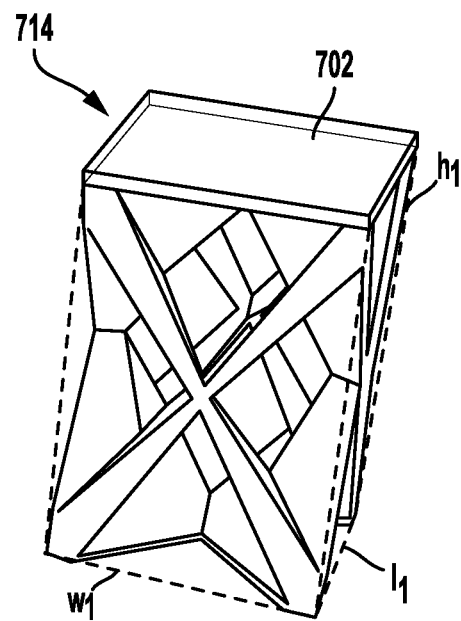

FIG. 7A illustrates an example table template 700, according to an exemplary embodiment. The template could be indicative of characteristics of a table, such as the different components of the table, possible arrangements of the components, possible dimensions of the table, materials from which the table could be constructed, among other characteristics. As illustrated in FIG. 7A, the table template 700 could include a surface 702 that is supported by a support structure. For instance, the table template 700 could indicate that the support structure of the table is one or more legs.

Furthermore, FIG. 7A also indicates the desired constraints on the table. For instance, the constraints could be indicative of desired dimensions of the table, such as a maximum perimeter of the table, which is indicated in FIG. 7A by a maximum width $w_1$ and maximum length $l_1$. The constraints could also be indicative of a desired height hi of the table. As explained above, the constraints could also be indicative of dimensions of the table, materials from which to construct the table, performance constraints, load constraints, etc.

Once the system has determined the characteristics of the table, the system could then generate a model for each of the components of the table. In particular, the system could generate, using the processes described above, one or more models of components of the table. In this example, the components of the table are a surface 702 and a structure that supports the surface 702 such that the surface 702 is level or horizontal when the table is placed on a level surface. And once the system has determined one or more models for each of the components, the system could, using the process above, generate one or more models for the table.

FIGS. 7B-7F each illustrate a model for the table generated by the system, according to exemplary embodiments. In particular, FIGS. 7B, 7C, 7D, 7E, and 7F, illustrate table models 704, 708, 710, 712, and 714, respectively. As illustrated in these figures, each table model satisfies the characteristics of a table since each table includes a surface and a support structure. Furthermore, as illustrated in FIGS. 7B-7F, each table satisfies the constraints on the table. For instance, each table is within the maximum dimensions specified by the constraints.

Returning to FIG. 4, after step 402 of determining the model, the system could be configured to perform a buildability analysis 404. In particular, the buildability analysis 404 could determine whether the model satisfies the product constraints. For example, a product constraint on table 700 in FIG. 7A could be indicative of a maximum perimeter of the table as indicated by a maximum width $w_1$ and maximum length $l_1$ of the table. In this example, the buildability analysis 404 could determine whether a generated model (e.g., one of the models illustrated in FIGS. 7B-7F) describes a table that satisfies the constraint. If the analysis determines that model does not satisfy that constraint, then the system could determine that the model is not buildable. On the other hand, if the model satisfies the constraints, then the analysis could determine that the model is buildable.

The buildability analysis 404 could also determine whether the model satisfies other functional features of the product. For example, the functional features could define the product's properties such as load limits, center of gravity, stability, stresses (e.g., bending stress), strengths (e.g., buckling strength), etc. The buildability analysis 404 could also determine whether the model satisfies the non-functional features defined by the constraints. For example, the system could determine whether the model satisfies aesthetic features (e.g., engravings, fixtures, etc.) defined by the constraints. Based on the analysis, the system could determine whether to proceed at the decision element 406. If the model is not buildable, the system could return to step 402 to determine a new model. If the model is buildable, the system could proceed to step 408.

In step 408, the system could generate a sequence of tasks to build the product according to the model. A task could be any type of task that could be performed in connection with building a product. Example types of tasks include construction tasks, manufacturing tasks, assembly tasks, processing tasks, etc. Additionally, a task could involve interacting with objects located in the worksite, such as parts, tools, obstacles, etc. Furthermore, a task could be performed using one or more tools available in the worksite.

In an embodiment, the system could generate permutations of the sequence of tasks that can be performed to build a product according to the selected model. In an example, the system could generate the permutations of the sequence of tasks using a tree structure. A tree structure could include a plurality of nodes between a root node and one or more final nodes. The nodes are arranged such that the root node branches into one or more nodes, each of which also branches into one or more nodes. The nodes continually branch into one or more nodes until a final node is reached. Furthermore, the root node represents the current status of the product, and each node could represent a task. And a final node could be indicative of a completion or final task of building a product.

Figure 8A:
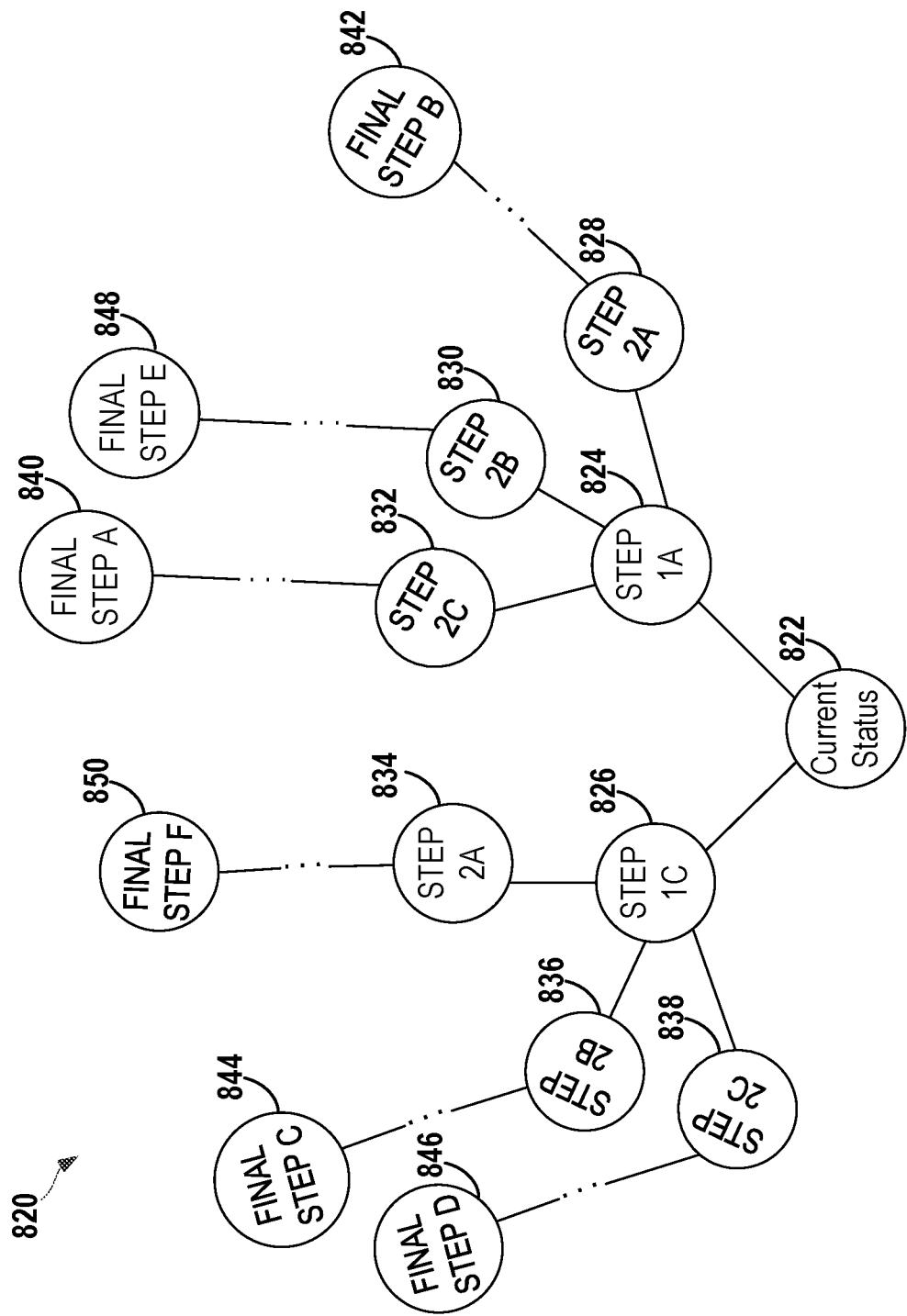
FIG. 8A illustrates a tree structure, according to an example embodiment.

FIG. 8A illustrates a tree structure 820, according to an exemplary embodiment. As illustrated in FIG. 8A, the tree structure 822 includes a root node 822, which could be indicative of the current statute of the build and/or the worksite. As further illustrated in FIG. 8A, one or more first steps could branch from the root node. In this example, two possible first steps 824 and 826 branch from the root node 822. As further illustrated, three second steps 828, 830, and 832 branch from the first step 824, and three second steps 834, 836, and 838. Each node could branch into one or more nodes until a final node is reached, where a final node represents a final step. As illustrated in FIG. 8A, there are one or more nodes between each of the second nodes (represented by the ellipses) and final nodes 840, 842, 844, 846, 848, and 850.

A permutation of the sequence of tasks could be determined by selecting a continuous sequence of nodes from the root node to a final node. The sequence of selected nodes represents steps of a permutation of the building process. For example, if no portion of the product has yet been built, the root node could be indicative of the current status of the worksite in which the product will be built. And the first node that is selected from the nodes that branch from the root node is the first step of a sequence of tasks to build the product in the worksite. However, if there is a portion of the product that has been built, then the root node is indicative of the built portion of the product. And the first node that is selected from the nodes that branch from the root node is the first step of a sequence of tasks that build off of the built portion of the product.

The system could then select a permutation of the sequences of tasks that satisfies the constraints. In an example, the system could select a permutation based on any specified performance constraints. For example, a performance constraint could indicate that the system should optimize the model for cost. Accordingly, the system could select the permutation of the sequence of tasks that has the least estimated cost. In some examples, a user of the system could define a default performance constraint to optimize for. Alternatively, if there isn't a performance constraint on the product, the system could select any of the permutations of the sequence of tasks that satisfy the constraints.

Once the system has selected the permutation of the sequence of tasks, the system could proceed to the simulation phase 304. In the simulation phase 304, the system could perform a simulation at step 410. Specifically, in order to perform the simulation, the system could determine an order of operations in which to perform the selected sequence of tasks. This could include determining resources for each task, assigning the necessary resources to that respective task, and determining an order in which tasks are to be performed. In some examples, the system may not be able to determine an order of operations for the sequence of tasks, and therefore, the system could determine that it is not possible to execute the selected sequence of tasks. In this scenario, the system could determine the permutation of the sequence of tasks is not feasible and may select a different permutation of the sequence of tasks. This process could be repeated until the system selects a permutation of that satisfies the constraints on the model.

Once the system has determined an order of operations, the system could simulate the performance of the sequence of tasks. During the simulation, the system could perform the buildability analysis 412 to determine whether the sequence of tasks can be performed using the system's resources. In one aspect, the system could determine whether the selected sequence of tasks could be performed by robotic devices available to the system. In an example, the system could determine whether each task of the selected permutation could be performed by a robotic device. In another aspect of the buildability analysis, the system could determine whether the system has the materials and parts to build the product according to the selected model and the selected sequence of tasks. If the system detects that buildability could fail for any reason (e.g., lack of resources, etc.), then the system could return to the step 408 of generating a sequence of tasks in order to select a different permutation of the sequence of tasks.

Furthermore, during the simulation step 410, the system could assign tasks of the selected sequence of tasks to one or more actors that are available in the worksite. In an example, the system could maintain a worker schedule, which indicates a schedule of the workers (both robotic and human) located in the worksite. The system could then assign the tasks of the building process to the available actors in the worksite. In an example, the system could assign all of the tasks to available robotic devices such that the product is built exclusively by robotic devices. The task that a robotic device is assigned could depend on a type of end-effector of the robotic device. The system could assign a task to a robotic device that includes an end-effector that is configured to perform that particular task. For instance, a task that involves moving an object could be assigned to a robotic device that includes a gripper end-effector.

b. Simulation Phase

Once the tasks have been assigned to actors, the system could simulate the sequence of tasks. In this step, the system could simulate the actors utilizing resources to execute the one or more tasks of the sequence of tasks in the worksite. The simulation could be indicative of how the robotic devices in the worksite would execute the tasks in the order specified by the order of operations. In some examples, the simulation could be performed at the same speed at which the robotic devices would perform the tasks in the worksite. In other examples, the simulation could be performed at a faster speed. Further, in some examples, a representation of the simulation could be displayed on a display of a computing device. Additionally and/or alternatively, the simulation could be recorded for future analysis.

Furthermore, the buildability analysis 412 could determine whether the simulated robotic devices can perform their assigned tasks using the specified resources and in the order indicated by the order of operations. In one aspect of the buildability analysis 412, the system could determine whether each simulated robotic device can perform its assigned task. In an example, the system could determine whether each simulated robotic device (that is assigned a task) will encounter a problem when performing its assigned task. For instance, the buildability analysis could detect failures or problems due to kinematic limitations of the robotic devices (e.g., joint limits and/or reachability limits). In another example, the system could determine velocity or acceleration constraints on our workers, and could identify whether certain kinds of tasks (e.g. glue deposition toolpaths) exceed the capabilities of the available robotic devices.

Additionally, in another aspect, the buildability analysis could detect any collisions that could occur between any of the objects that are located in the worksite, such as potential collisions between robotic devices performing their respective tasks, collisions between a robotic device and an object in the worksite, among other examples. The system could also determine whether each simulated robotic device could reach the areas where it needs to be located in order to perform its assigned task.

In yet another aspect of the buildability analysis 412, the system could determine whether the simulated structure is stable throughout the construction of the product. In yet another aspect, the system could also determine whether the resources available to the system are adequate to complete the project. During the buildability analysis 412, if the system detects that the design is not buildable using the selected building process (i.e., selected model and/or selected sequence of tasks), the system could make a decision at decision element 414 to return to the step 408 of generating a sequence of tasks in order to select a different permutation of the sequence of tasks. Conversely, if the system completes the simulation and does not detect any issues with the sequence of tasks, the system could make a decision at decision element 414 to proceed to the build phase 306.

c. Build Phase

In the build step 416, the system could implement the selected model in the worksite by causing actors in the worksite to perform the selected sequence of tasks. To perform a step of the sequence of tasks, the system could send instructions to the actors that cause the actors to perform their assigned tasks. For instance, the instructions for a task could be sent to a robotic device when the robotic device is scheduled to perform the task. In another example, the system could send instructions to human workers via computing devices, which the workers could be using to interface with the system.

Additionally, in the build phase 306, the system could generate and maintain a world map that includes data indicative of the worksite. The system could use data received from devices (e.g., global and local sensors 230 and 240 of FIG. 2) located in the worksite to generate the world map. The world map could include an overview of the all of the actors in the worksite, the tasks that are carried out by the actors, and the relevant locations of resources and objects in the worksite. The world map could also include a description, location, and amount of each of the resources in the worksite. For instance, the world map could include an inventory of each type of material available to the system. Furthermore, the system could dynamically update the world map in real-time using at least the data received from devices (e.g., robotic devices, sensors, etc.) located in the worksite. As such, the world map not only could define spatial features of the worksite, but could also include physical details of the worksite, such as changes that could be occurring to the worksite in real-time. Accordingly, a live link between the world map and the physical world could be established.

Figure 8B:
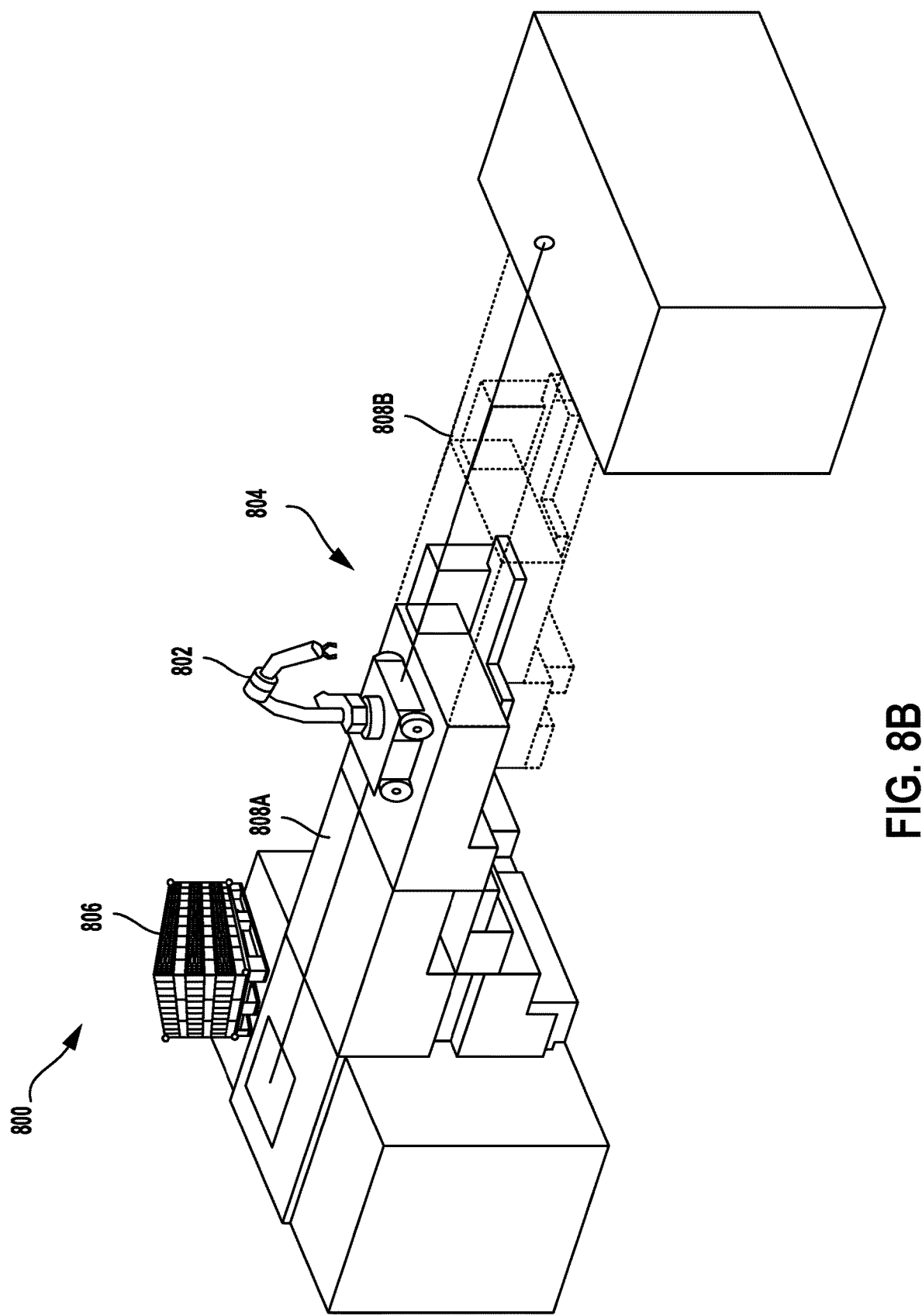
FIG. 8B depicts a robotic device performing a task, according to an example embodiment.

FIG. 8B illustrates a world map 800 of a robotic device 802 constructing a bridge 804. As illustrated in FIG. 8B, the world map 800 depicts an "as-built" portion 808A of the bridge 804. As also illustrated in FIG. 8B, the word map also depicts an outline of a design 808B of a portion of the bridge 804 that is to be built. In this example, the robotic device has commenced the build phase of building the bridge. Therefore, the robotic device 802 could be performing tasks associated with a sequence of tasks to build the bridge 804 using resources 806.

In an embodiment, the system could, periodically or continuously, perform a buildability analysis 418 during the build phase 306. The buildability analysis 418 analyzes the feasibility of building the product according to the sequence of tasks and/or the model. Within examples, the buildability analysis 418 could be performed before building the product. Additionally and/or alternatively, the buildability analysis 418 could be performed while the product is being built. Note that although process 416 and process 418 are shown as two separate processes in FIG. 4, the system could perform the process simultaneously. As such, the system could perform the buildability analysis 418 as the workers are performing the build 416.

In an embodiment, to perform the buildability analysis 418, the system could analyze data from the world map to detect any issues that could affect the feasibility of building the product. In one aspect, the system could compare the as-built portion of the product to the model of the product. If the system detects a deviation of the as-built portion from the model, the system could then determine whether the product would still satisfy the constraints. Additionally and/or alternatively, the system could determine whether the tasks of the sequence of tasks that have not been performed could still be performed. Additionally and/or alternatively, the system could determine whether performing the tasks that have not been performed would further compound on the deviation such that the final product would not satisfy the constraints.

For example, the system could analyze the world map 800 of the bridge project. For instance, system could determine whether the as-built portion 808A is built according to the model, perhaps by comparing the dimensions of the as-built portion 808A to the dimensions in the corresponding portion of the model. The system could also determine characteristics of the as-built portion 808A, such as the weight bearing capacity of the bridge, and could compare the determined characteristics to the desired characteristics. The system could also determine whether the robotic device 802 could build the unbuilt portion of the bridge 804, perhaps by determining whether the resources 806 include the resources necessary to build the bridge 804. The system could also determine whether tasks associated with building the unbuilt portion 808B could be performed. For instance, the system could determine whether there was any delay in building the bridge 804, and if there was a delay, whether the system could still complete the unperformed tasks within a time-limit that is set by the constraints.

The system could analyze other data from the world map that could affect the buildability of a project. In one example, the system could determine whether the resources in the worksite are sufficient to complete the construction of the product. In another example, the system could detect any changes or events in the worksite that could disrupt the performance of the sequence of tasks. For instance, the system could detect if the conditions in the worksite change in a way that can affect the building process (e.g., significant temperature change). The system could also detect any new obstacles that are introduced into the worksite, which may impact the performance of the sequence of tasks.

In another aspect of the buildability analysis 418, the system could receive an input that indicates a change to the design and/or constraints. And in response, the system could determine whether the product is still buildable using the selected sequence of tasks in light of the changes to the design and/or constraints. For example, the system could receive an input that indicates a change to a performance constraint. In response, the system could determine whether the current sequence of tasks could satisfy the new performance constraint.

If the system determines that the product is not buildable using the current sequence of tasks, the system could determine to select a new sequence of tasks. In an embodiment, in response to determining that the product is not buildable, the system could detect an error at decision element 420. Then, the system could return to generate sequence of tasks step 408. At step 408 of generating a sequence of tasks, the system could generate a new sequence of tasks. In an example, the new sequence of tasks could achieve the same design as the previous sequence of tasks, but possibly using different steps.

In an embodiment, the system could use the tree structure to generate a new sequence of tasks. As explained above, the root node of the tree structure represents the current state of the project. In this case, the as-built portion of the product is current state of the project, and therefore, is represented as the root node. As such, the first nodes that branch from the root node represent first steps that build off of the built portion of the product. Then, the system could select a sequence of tasks that starts from the root node and ends at a final node of tree structure. The final node of the new sequence of tasks could be the same final node as the original sequence of tasks, or could be a different final node. By generating the new sequence of tasks in this manner, the system could build on the as-built portion of the output product, and thus the system could preserve work that has already been performed.

To facilitate generating the new sequence of tasks, the system could determine the last task that was performed before the system determined to generate a new sequence of tasks. The system could then determine the node in the building tree with which that task is associated, and could designate that node as the root node. The system may then select a continuous sequence of nodes between the root node and a final node. The new sequence of nodes is different than the originally selected sequence of nodes. Once the new sequence is generated, the system could then perform the processes as indicated in FIG. 4.

In some examples, the system could determine that a sequence of tasks for the original design is not achievable. The system could then return to step 402 of determining a model for the product. At step 402, the system could select one of the models that were previously generated and that satisfy the constraints. Alternatively, the system could generate a new model that builds off of the as-built portion of the product. Once the new model is generated the system could perform the processes of each phase as described above. In some examples, after the system after completing the processes of the design phase 302, may skip the simulation phase 304 and move directly to the build phase 306.

Nonetheless, once the new sequence of tasks and/or model is generated, the system could resume building the product. In some examples, if the system detects a potential issue before the issue actually occurs, the system could adjust to the issue without stopping the build 416. However, if the issue that arises affects the task that is currently being performed, the system could pause the build 416 until the system determines an adjustment. Once the adjustment is determined, the system could resume the build 416.

Operations relating to the robotic control system described above may be implemented as a method by one or more processors. As explained above, the robotic control system may operate one or more robotic devices. Therefore, there may be exchange of signals between the robotic device and the robotic control system. Example methods 900 and 1000 that describe the operations of a robotic control system are illustrated in the form of flowcharts in FIGS. 9 and 10 respectively.

Figure 9:
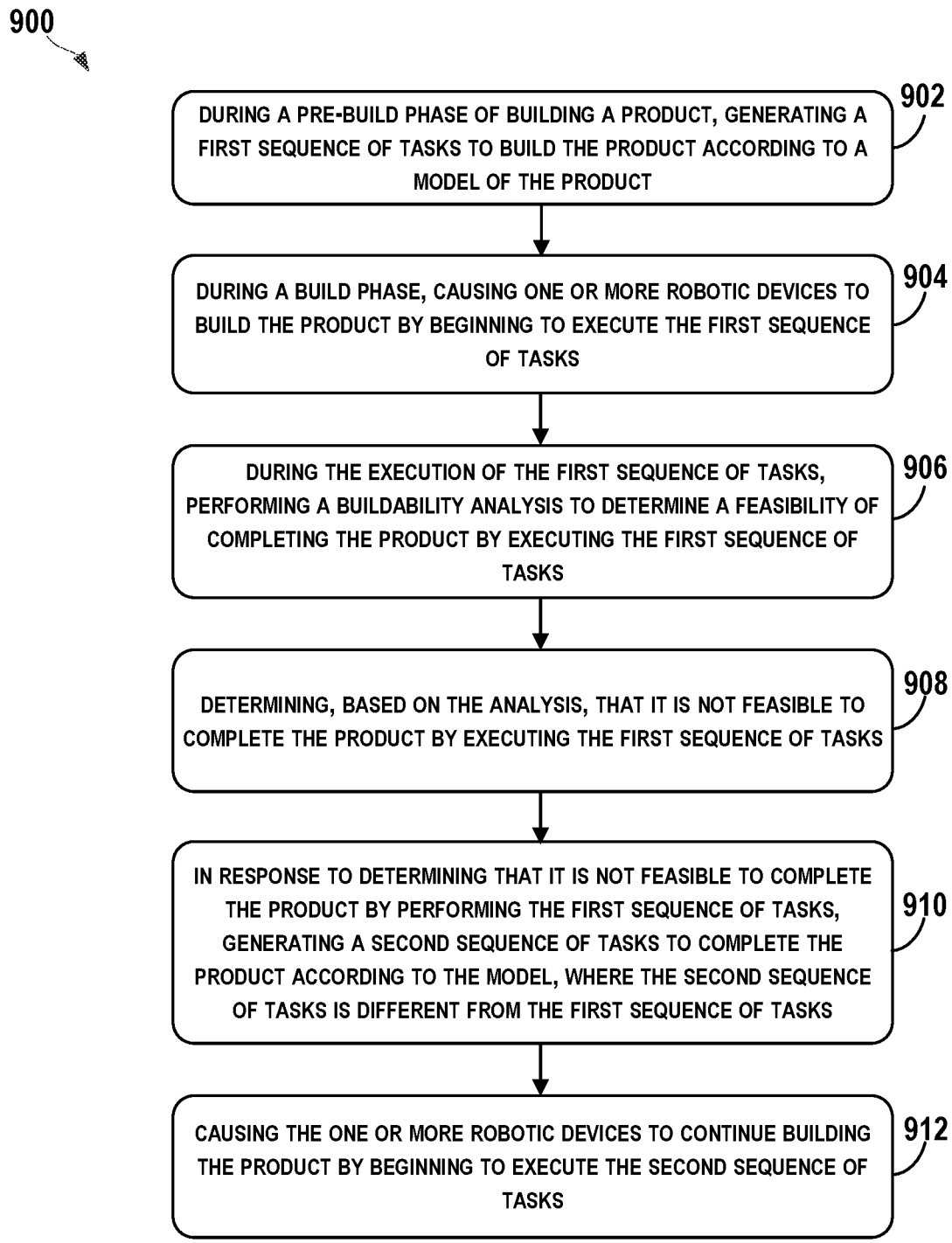
FIG. 9 is a flowchart illustrating a method, according to an example embodiment.

FIG. 9 illustrates an example method 900 of the worksite automation system building an output product, according to an example embodiment. As illustrated in block 902, method 900 involves during a pre-build phase of building a product, generating a first sequence of tasks to build the product according to a model of the product. As illustrated by block 904, the method 900 also involves during a build phase, causing one or more robotic devices to build the product by beginning to execute the first sequence of tasks. As shown in block 906, the method 900 further involves during the execution of the first sequence of tasks, performing a buildability analysis to determine a feasibility of completing the product by executing the first sequence of tasks.

As illustrated by block 908, the method 900 further involves determining, based on the analysis, that it is not feasible to complete the product by executing the first sequence of tasks. As shown by block 910, the method 900 additionally involves in response to determining that it is not feasible to complete the product by performing the first sequence of tasks, generating a second sequence of tasks to complete the product according to the model, where the second sequence of tasks is different from the first sequence of tasks. As shown by block 912, the method 900 yet further involves causing the one or more robotic devices to continue building the product by beginning to execute the second sequence of tasks. In particular, the system begins to execute the second sequence of tasks instead of executing the first sequence of tasks. Furthermore, this process can be cyclical. For instance, during the execution of the second sequence of tasks, the system could determine, based on a buildability analysis, that it is not feasible to complete the product by performing the second sequence of tasks. Accordingly, the system could generate a third sequence of tasks. Then, the system could begin to execute the third sequence of tasks instead of executing the second sequence of tasks, and so forth.

Figure 10:
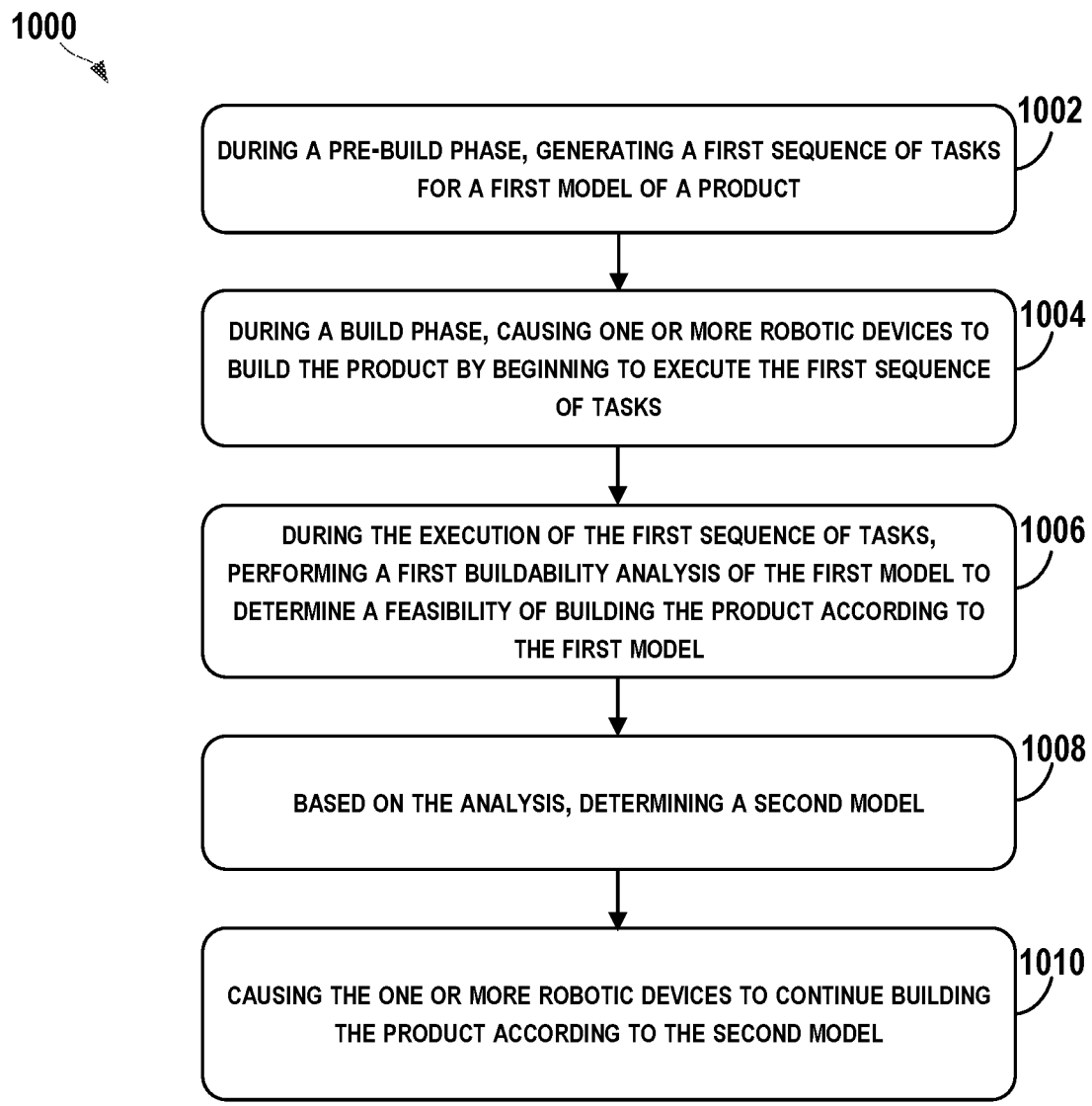
FIG. 10 is a flowchart illustrating another method, according to an example embodiment.

FIG. 10 illustrates another example method 1000 of the worksite automation system building an output product, according to an example embodiment. As shown by block 1002, the method 1000 involves during a pre-build phase, generating a first sequence of tasks for a first model of a product. Further, as shown by block 1004, the method 1000 involves, during a build phase, causing one or more robotic devices to build the product by beginning to execute the first sequence of tasks. As shown by block 1006, the method 1000 also involves during the execution of the first sequence of tasks, performing a first buildability analysis of the first model to determine the feasibility of building the product according to the first model. Furthermore, as shown by block 1008, the method 1000 involves based on the analysis, determining a second model. Additionally, as shown by block 1010, the method 1000 involves causing the one or more robotic devices to continue building the product according to the second model.

D. Example Robotic Device

Figure 11:
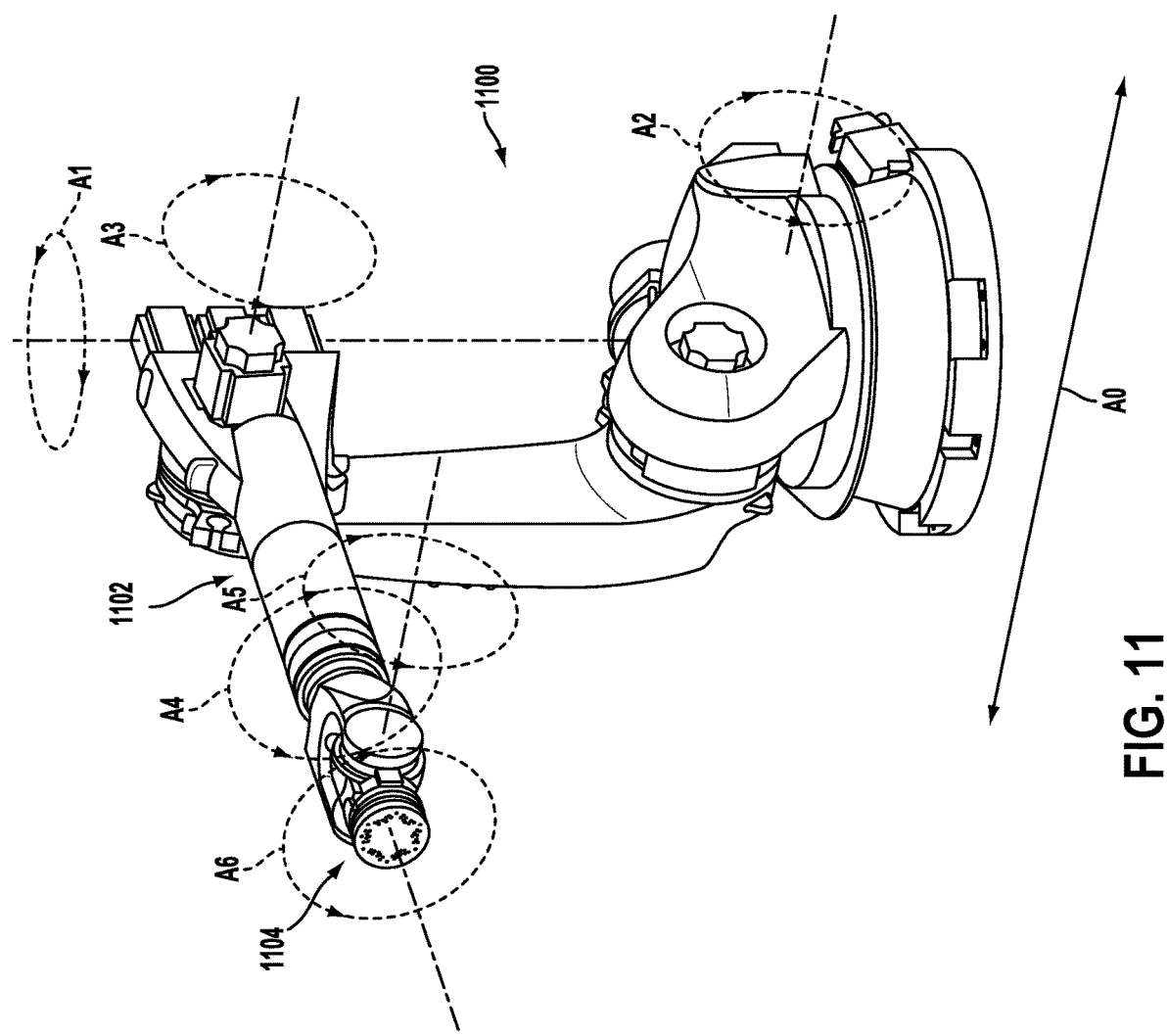
FIG. 11 shows a view of a robot, according to an example embodiment.

FIG. 11 illustrates a robotic device, according to an example embodiment. In particular, robotic device 1100 may include a robotic arm 1102 with an end effector 1104 capable of being equipped with one or more different tools, grippers, or guides. The robotic arm 1102 may be capable of motion along six degrees of freedom, depicted in FIG. 11A as A1-A6. In certain examples, robotic device 1100 may be further capable of motion along one or more axes A0, such as along a rail which is not shown that allows side to side movement. In certain embodiments, instructions may be given to position end effector 1104 at a specific location, and the positions of the robotic arm 1104 along A1-A6 and/or of robotic device actor 1100 along one or more axes A0 may be calculated by a process of the related controller. In alternative embodiments, position control of robotic device 1100 and/or robotic arm 1102 may require separate, individual settings and control commands. Robotic devices operating with fewer degrees of freedom may be used in some examples as well or instead.

The robotic device 1100 may have a fixed end effector or may be able to interchange end effectors. In order to interchange end effectors, the robotic device 1100 may have access to a plurality of end effectors that may be stored on or near the robotic device 1100. The plurality of end effectors may include end effectors of different types, such as tool end effectors, gripper end effectors, and guide end effectors. As such, the robotic device 1100, which has the ability to interchange end effectors, may be assigned different tasks that require different types of end effectors. As explained herein, a robotic device 1100 may select an end effector based on a task that is assigned to the robotic device 1100.

Figure 12:
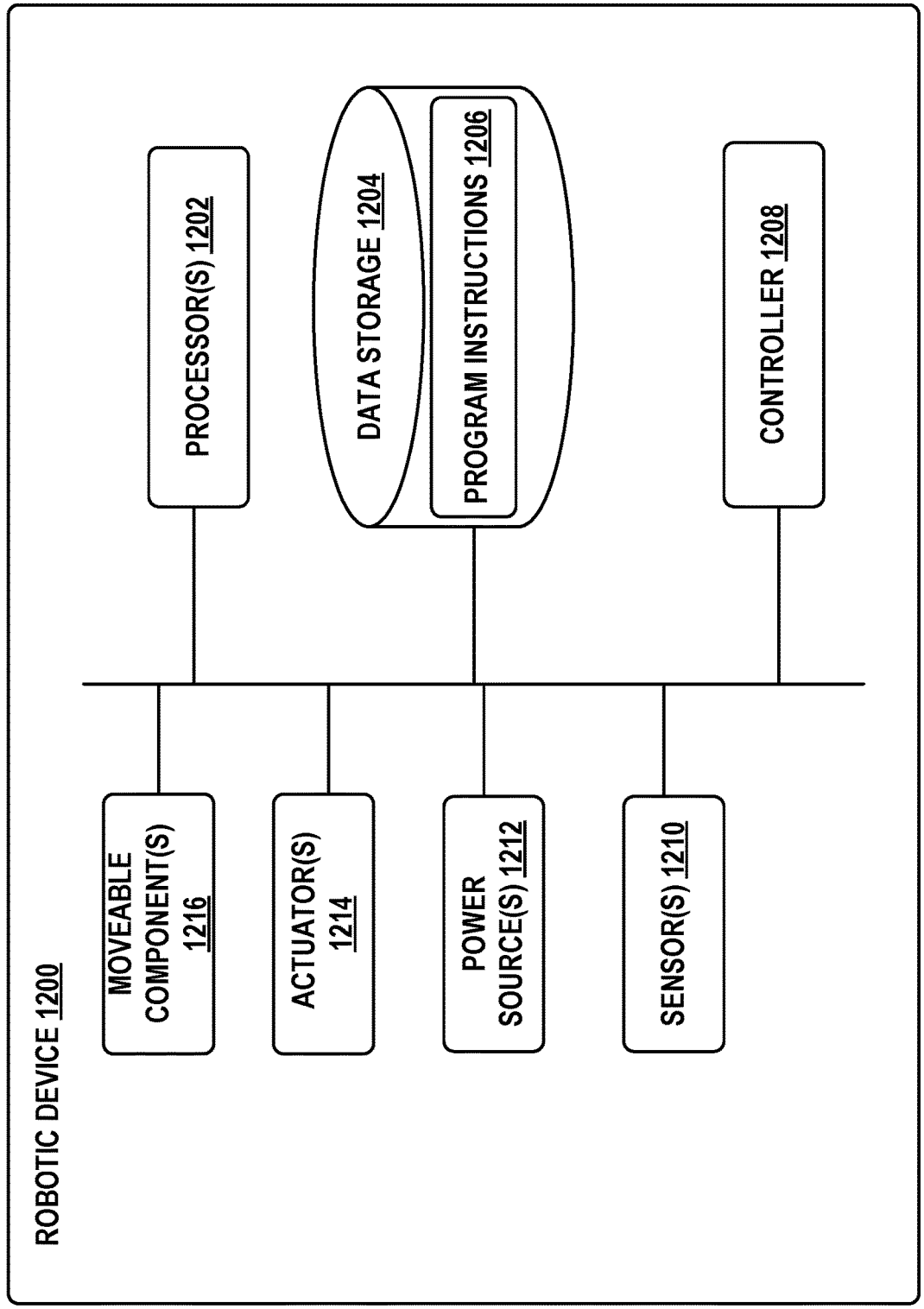
FIG. 12 is a simplified block diagram depicting components of a robotic device, according to an example embodiment.

FIG. 12 shows an example configuration of a robotic device 1200. Generally, a robotic device 1200 may be any device that has a computing ability and interacts with its surroundings with an actuation capability and/or with ability to emit/generate physical phenomena such as light and/or sound, among others. For instance, the robotic device 1200 may be a humanoid robot, a robotic arm, or a quadruped robot, among others. A robotic device may also be any device that is generally understood to those of ordinary skill in the art as being a "robotic." The robotic device 1200 may also be referred to as a robotic device, a robotic manipulator, a robot client, or a robot, among others.

The robotic device 1200 is shown to include processor(s) 1202, data storage 1204, program instructions 1206, controller 1208, sensor(s) 1210, power source(s) 1212, actuator(s) 1214, and movable component(s) 1216. Note that the robotic device 1200 is shown for illustration purposes only and robotic device 1200 may include additional components and/or have one or more components removed without departing from the scope of the disclosure. Further, note that the various components of robotic device 1200 may be arranged and connected in any manner.

Moreover, the above description of processor(s) 252, data storage 254, program instructions 256, sensors (e.g., local sensor(s) 230 and global sensor(s) 240), and/or power source 262, may apply to any discussion below relating to the respective component being used in another system or arrangements. For instance, as noted, FIG. 12 (among other possible figures) illustrates processors, data storage, program instructions, sensors, and/or power as being incorporated in another arrangement. These components at issue may thus take on the same or similar characteristics (and/or form) as the respective components discussed above in association with FIG. 2. However, the components at issue could also take on other characteristics (and/or form) without departing from the scope of the disclosure.

As noted, the robotic device 1200 may include a controller 1208 (e.g., taking the form of a microcontroller). The controller 1208 may include processing unit and data storage, and may be arranged to manage or carry out various operations (e.g., individually or in collaboration with processor(s) 1202). Thus, this controller 1208 could take on the same or similar characteristics (and/or form) as the above-mentioned controller 250, but could take on other characteristics (and/or form) as well. So in some implementations, the controller 250 may be incorporated as part the robotic device 1200 and thus controller 250 may itself be controller 1208. In other implementation, controller 1208 may be included as part of the robotic device 1200 and controller 250 may be separate from the robotic device 1200. Regardless of the implementations, these controllers may take various forms. For instance, a controller may take the form of a chip set, a server system, a digital signal processor, a programmable logic controller, and/or a sampled-data system, among other possibilities. Moreover, a controller could also be referred to herein as a control system, among other.

Additionally, the robotic device 1200 may also include one or more actuator(s) 1214. An actuator is a mechanism that may be used to introduce mechanical motion. In particular, an actuator may be configured to convert stored energy into movement of one or more components. Various mechanisms may be used to power an actuator. For instance, actuators may be powered by chemicals, compressed air, hydraulics, or electricity, among other possibilities. With this arrangement, actuator(s) 1214 may cause movement of various movable component(s) 1216 of the robotic device 1200. The moveable component(s) 1216 may include appendages/members such as robotic arms, legs, and/or hands, among others. The moveable component(s) 1216 may also include a movable base, wheels, and/or end effectors, among others. Further, when a robotic device 1200 includes at least one end effector, such an end effector may be a tool (e.g., a screwdriver, drill, welding iron, or some combination thereof) and/or a gripper, among others as discussed above.

E. Example Computing Device

Figure 13:
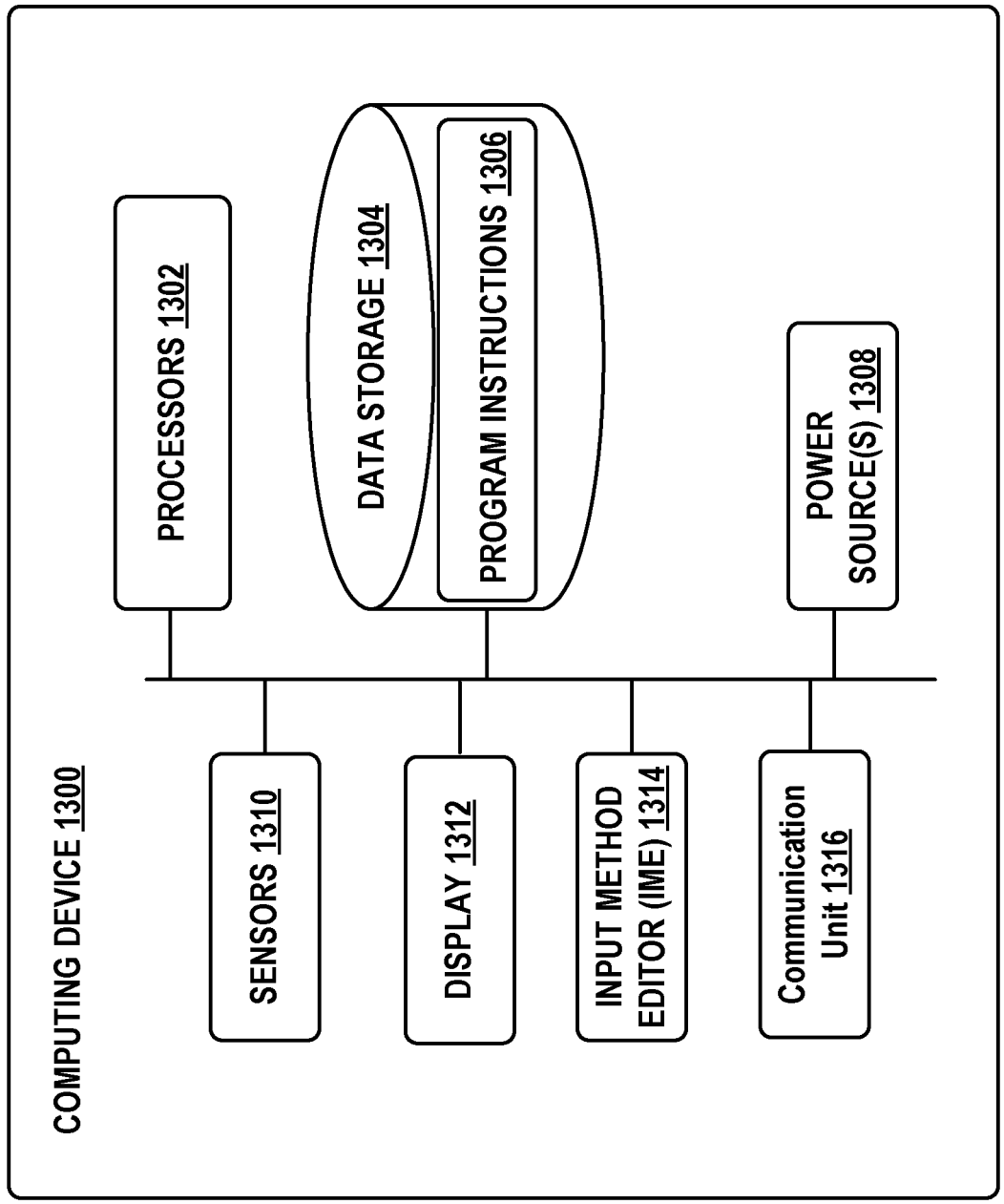
FIG. 13 is a simplified block diagram depicting components of a computing device, according to an example embodiment.

FIG. 13 is a block diagram showing components of an example computing device 1300 that includes one or more processors 1302, data storage 1304, program instructions 1306, power source(s) 1308, sensors 1310, display 1312, and Input Method Editor (IME) 1314. Note that the computing device 1300 is shown for illustration purposes only and computing device 1300 may include additional components and/or have one or more components removed without departing from the scope of the disclosure. Further, note that the various components of computing device 1300 may be arranged and connected in any manner.

Display 1312 may take on any form (e.g., LED, LCD, OLED, etc.). Further, display 1312 may be a touchscreen display (e.g., a touchscreen display on a tablet). Display 1312 may show a graphical user interface (GUI) that may provide an application through which the user may interact with the systems disclosed herein.

Further, the computing device 1300 may receive user input (e.g., from the user of the computing device 1300) via IME 1314. In particular, the IME 1314 may allow for interaction with the GUI such as for scrolling, providing text, and/or selecting various features of the application, among other possible interactions. The IME 1314 may take on various forms. In one example, the IME 1314 may be a pointing device such as a computing mouse used for control of the GUI. However, if display 1312 is a touch screen display, user touch input can be received (e.g., such as using a finger or a stylus) that allows for control of the GUI. In another example, IME 1314 may be a text IME such as a keyboard that provides for selection of numbers, characters and/or symbols to be displayed via the GUI.

For instance, in the arrangement where display 1312 is a touch screen display, portions of the display 1312 may show the IME 1314. Thus, touch-input on the portion of the display 1312 including the IME 1314 may result in user-input such as selection of specific numbers, characters, and/or symbols to be shown on the GUI via display 1312. In yet another example, the IME 1314 may be a voice IME that may be used that receives audio input, such as from a user via a microphone of the computing device 1300, that is then interpretable using one of various speech recognition techniques into one or more characters than may be shown via display 1312. Other examples may also be possible.

The computing device 1300 may also include a communication unit 1316. The communication unit 1316 may include wired links and/or wireless links (e.g., using various wireless transmitters and receivers). A wired link may include, for example, a parallel bus or a serial bus such as a Universal Serial Bus (USB). A wireless link may include, for example, Bluetooth, IEEE 802.11 (IEEE 802.11 may refer to IEEE 802.11-2007, IEEE 802.11n-2009, or any other IEEE 802.11 revision), Cellular (such as GSM, GPRS, CDMA, UMTS, EV-DO, WiMAX, HSPDA, or LTE), or Zigbee, among other possibilities. Furthermore, multiple wired and/or wireless protocols may be used, such as "3G" or "4G" data connectivity using a cellular communication protocol (e.g., CDMA, GSM, or WiMAX, as well as for "WiFi" connectivity using 802.11).

The computing device 1300 may be coupled with one or more sensors such as optical flow sensors, force sensors, proximity sensors, motion sensors (e.g., gyroscopes, and/or accelerometers), load sensors, position sensors, thermal imaging sensors, depth sensors (e.g., RGB-D, laser, structured-light, and/or a time-of-flight camera), ultrasonic range sensors, infrared sensors, optical sensors, Radio Frequency identification (RFID) systems, Near Field Communication (NFC) chip, wireless sensors, light sensors, touch sensors (e.g., capacitive sensors), cameras (e.g., color cameras, grayscale cameras, and/or infrared cameras), and/or range sensors (e.g., ultrasonic and/or infrared), among others.

III. Additional Features

A. Serialization

Within examples, the various data that is generated by the system could be serialized and stored in a data storage of the system (e.g., data storage 1304 in FIG. 13). For instance, the system could serialize a product model, a tree used to generate possible task sequences, a world map of the worksite, among other data generated by the system. In particular, serializing the data could allow the system to pause building a product and resume at a later time. For example, the building process could be paused once working hours are over, and could be resumed at the start of working hours. Once the building process is resumed, the system could retrieve the last instance of the data (e.g., the last model, tree structure, world map, etc.). Then, the system could update the data to account for any changes that may have occurred while the system was paused. Once the data is updated, the system could perform a buildability analysis to determine whether the last instance of the model and/or sequence of tasks could still be used.

B. Machine Learning

In addition to the examples described above, the system could use machine learning, statistical analysis, and/or other analysis techniques to learn how a particular product is defined. In particular, the system could learn what a particular product is by ingesting 3D models of chairs, e.g., from online catalogs or other sources. Then the system could learn the functional properties of the chair and/or of components thereof. For instance, the system could analyze data such as a set of properties of the product. For example, the set of properties could be indicative of aesthetic properties, such as color, markings, visual patterns, and surface finish/texture, among other properties. Additionally or alternatively, the set of properties could be indicative of mechanical properties, such as bending strength, brittleness, bulk modulus, coefficient of friction, compressive strength, creep, elasticity, fatigue strength, flexibility, fracture toughness, hardness, plasticity, resilience, shear strength, stiffness, stress/strain properties, surface roughness, tensile strength, toughness, viscosity, yield strength, and weight, among other properties. Additionally and/or alternatively, the set of properties could be indicative of geometric properties such as shape, size, orientation, angles, etc.

Additionally or alternatively, the set of properties could be indicative of electrical and/or magnetic properties, such as capacitance, conductivity, density, dielectric strength, field properties, inductance, permittivity, and resistance, among other properties. Additionally or alternatively, the set of properties could be indicative of chemical properties, such as corrosion resistance, flammability, pH, reactivity, stability, surface energy/tension, and toxicity, among other properties. Additionally or alternatively, the set of properties could be indicative of manufacturing properties for coating, cutting, drilling, forming and shaping processes, heat treating, joining, machining, rolling, sanding, and welding, among other techniques. Additionally or alternatively, the set of properties could be indicative of optical properties, such as absorbance, fluorescence, photosensitivity, reflectivity, refractive index, scattering, and transmittance, among other properties. Additionally or alternatively, the set of properties could be indicative of thermal properties, such as boiling point, critical point, emissivity, melting point, specific heat, thermal conductivity, thermal diffusivity, and thermal expansion, among other properties.

For example, the system could learn what a chair is by learning possible load support constraints (e.g., weight of a person, load bearing surface locations), among other features, that define a chair. Such a system could then generate a model of a chair per its definition of a chair. Furthermore, the system could receive feedback that it could use to refine its definition or understanding of a particular product. Such feedback could include feedback from a user of the product. Additionally, the feedback could be input into the machine learning model so that the system could continuously refine its definition of a product.

IV. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

A block that represents a processing of information, such as a block of a method described above, may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

We claim:

1. A computer-implemented method comprising:
receiving a set of specifications and a set of desired performance constraints for a product that is to be built;
generating, based on the received set of specifications, a model of the product that indicates how a physical structure of the product that is to be built is to be configured, and how the product that is to be built will function once built;
comparing an as-built portion of the product to the model of the product;
determining, based on comparing the as-built portion of the product to the model of the product, that the product that is to be built still satisfies the received set of desired performance constraints;
in response to determining that the product that is to be built still satisfies the received set of desired performance constraints, generating multiple candidate sequence of tasks that each can be performed by one or more robotic devices to build the product from the as-built portion of the product;
simulating performance of each of the multiple candidate sequences of tasks that each can be performed by the one or more robotic devices to build a product, comprising, for each of the multiple candidate sequences of tasks:
determining an order in which each task of the candidate sequence of tasks is to be performed based on an availability of one or more respective resources that are associated with each task;
assigning each task of the candidate sequence of tasks to one or more of the robotic devices,
simulating the candidate sequence of tasks in the determined order using the one or more of the robotic devices to which each task was assigned, and
determining, based on simulating the candidate sequence of tasks, whether the one or more robotic devices are capable of successfully building the product;
selecting a particular sequence of tasks, from among the multiple candidate sequences of tasks, that is determined, based on simulated performance of the particular sequence of tasks, to be capable of successfully building the product; and
performing, while the particular sequence of tasks remains incomplete and while simulation of a performance of remaining tasks of the sequence of tasks on the as-built portion of the product indicates that the product will still satisfy the model, the particular sequence of tasks.

2. The method of claim 1, wherein the model comprises a three-dimensional (3d) representation of the product.

3. The method of claim 1, wherein the received set of desired performance constraints specify one or more materials out of which the product is to be built.

4. The method of claim 1, comprising adjusting the model to satisfy the received set of desired performance constraints.

5. The method of claim 1, comprising a tree structure that indicates different permutations of the candidate sequences of tasks.

6. The method of claim 1, wherein simulating performance each candidate sequence of tasks comprises determining whether a particular robotic device will collide with another robotic device while performing a particular task.

7. A non-transitory computer-readable medium storing software comprising instructions executable by one or more computers which, upon such execution, cause the one or more computers to perform operations comprising:
receiving a set of specifications and a set of desired performance constraints for a product that is to be built;
generating, based on the received set of specifications, a model of the product that indicates how a physical structure of the product that is to be built is to be configured, and how the product that is to be built will function once built;
comparing an as-built portion of the product to the model of the product;
determining, based on comparing the as-built portion of the product to the model of the product, that the product that is to be built still satisfies the received set of desired performance constraints;
in response to determining that the product that is to be built still satisfies the received set of desired performance constraints, generating multiple candidate sequence of tasks that each can be performed by one or more robotic devices to build the product from the as-built portion of the product;
simulating performance of each of the multiple candidate sequences of tasks that each can be performed by the one or more robotic devices to build a product, comprising, for each of the multiple candidate sequences of tasks:
determining an order in which each task of the candidate sequence of tasks is to be performed based on an availability of one or more respective resources that are associated with each task;
assigning each task of the candidate sequence of tasks to one or more of the robotic devices,
simulating the candidate sequence of tasks in the determined order using the one or more of the robotic devices to which each task was assigned, and
determining, based on simulating the candidate sequence of tasks, whether the one or more robotic devices are capable of successfully building the product;
selecting a particular sequence of tasks, from among the multiple candidate sequences of tasks, that is determined, based on simulated performance of the particular sequence of tasks, to be capable of successfully building the product; and
performing, while the particular sequence of tasks remains incomplete and while simulation of a performance of remaining tasks of the sequence of tasks on the as-built portion of the product indicates that the product will still satisfy the model, the particular sequence of tasks.

8. The medium of claim 7, wherein the model comprises a three-dimensional (3d) representation of the product.

9. The medium of claim 7, wherein the received set of desired performance constraints specify one or more materials out of which the product is to be built.

10. The medium of claim 7, wherein the operations comprise adjusting the model to satisfy the received set of desired performance constraints.

11. The medium of claim 7, wherein the operations comprise a tree structure that indicates different permutations of the candidate sequences of tasks.

12. The medium of claim 7, wherein simulating performance each candidate sequence of tasks comprises determining whether a particular robotic device will collide with another robotic device while performing a particular task.

13. A system comprising:
one or more computers; and
one or more storage devices storing instructions that are operable, when executed by the one or more computers, to cause the one or more computers to perform operations comprising:
receiving a set of specifications and a set of desired performance constraints for a product that is to be built;
generating, based on the received set of specifications, a model of the product that indicates how a physical structure of the product that is to be built is to be configured, and how the product that is to be built will function once built;
comparing an as-built portion of the product to the model of the product;
determining, based on comparing the as-built portion of the product to the model of the product, that the product that is to be built still satisfies the received set of desired performance constraints;
in response to determining that the product that is to be built still satisfies the received set of desired performance constraints, generating multiple candidate sequence of tasks that each can be performed by one or more robotic devices to build the product from the as-built portion of the product;
simulating performance of each of the multiple candidate sequences of tasks that each can be performed by the one or more robotic devices to build a product, comprising, for each of the multiple candidate sequences of tasks:
determining an order in which each task of the candidate sequence of tasks is to be performed based on an availability of one or more respective resources that are associated with each task;
assigning each task of the candidate sequence of tasks to one or more of the robotic devices,
simulating the candidate sequence of tasks in the determined order using the one or more of the robotic devices to which each task was assigned, and
determining, based on simulating the candidate sequence of tasks, whether the one or more robotic devices are capable of successfully building the product;
selecting a particular sequence of tasks, from among the multiple candidate sequences of tasks, that is determined, based on simulated performance of the particular sequence of tasks, to be capable of successfully building the product; and performing, while the particular sequence of tasks remains incomplete and while simulation of a performance of remaining tasks of the sequence of tasks on the as-built portion of the product indicates that the product will still satisfy the model, the particular sequence of tasks.

14. The system of claim 13, wherein the model comprises a three-dimensional (3d) representation of the product.

15. The system of claim 13, wherein the received set of desired performance constraints specify one or more materials out of which the product is to be built.

16. The system of claim 13, wherein the operations comprise adjusting the model to satisfy the received set of desired performance constraints.

17. The system of claim 13, wherein the operations comprise a tree structure that indicates different permutations of the candidate sequences of tasks.

* * * * *